(12) United States Patent
Chiba

(10) Patent No.: US 7,764,282 B2
(45) Date of Patent: Jul. 27, 2010

(54) VISUALIZING SYSTEM, VISUALIZING METHOD, AND VISUALIZING PROGRAM

(75) Inventor: Tatsuro Chiba, Tokyo (JP)

(73) Assignee: Asia Air Survey Co., Ltd. (JP)

( * ) Notice: Subject to any disclaimer, the term of this patent is extended or adjusted under 35 U.S.C. 154(b) by 700 days.

(21) Appl. No.: 10/533,675

(22) PCT Filed: Nov. 5, 2003

(86) PCT No.: PCT/JP03/14118

§ 371 (c)(1),
(2), (4) Date: Dec. 22, 2005

(87) PCT Pub. No.: WO2004/042675

PCT Pub. Date: May 21, 2004

(65) Prior Publication Data

US 2006/0262117 A1    Nov. 23, 2006

(30) Foreign Application Priority Data

Nov. 5, 2002    (JP) .............................. 2002-321634

(51) Int. Cl.
G06T 15/00 (2006.01)
G06T 15/50 (2006.01)
G06T 15/60 (2006.01)
G09G 5/00 (2006.01)
G09G 5/377 (2006.01)
H04N 13/00 (2006.01)

(52) U.S. Cl. ................... 345/419; 345/426; 345/629; 345/639; 345/640; 348/42

(58) Field of Classification Search ............. 345/419, 345/423, 424, 426, 440; 348/42
See application file for complete search history.

(56) References Cited

U.S. PATENT DOCUMENTS 4,357,660 A * 11/1982 Hepp ...................... 702/10
4,467,461 A *  8/1984 Rice ...................... 367/70

(Continued)

OTHER PUBLICATIONS

Shinohara, et al., "Color image analysis in a vector field", Canadian Conference on Electrical and Computer Engineering, Sep. 14-17, 1993, pp. 23-26.*

(Continued)

*Primary Examiner*—Ulka Chauhan
*Assistant Examiner*—Roberta Prendergast
(74) *Attorney, Agent, or Firm*—Kilpatrick Stockton LLP

(57) ABSTRACT

A vector field (70) including its local three-dimensional attribute is substantially visualized on a two-dimensional field of view in an intuitionally visible way (p5, p8). For the visualization, the vector field (70) is mapped onto a three-dimensional coordinate space (80) to produce corresponding coordinate point sequences (p1), the degree of elevation (A) in a local area of a plane in which the coordinate point sequences are connected (p2) is determined, the degree of depression (C) in the local area is determined (p3), the degree of elevation/depression (B) in the local area is determined by weight-combining the degree of elevation (A) and the degree of depression (C) (p4), the coordinate space (80) is mapped onto a two-dimensional plane (90), and gray-scale display (F) corresponding to the degree of elevation/depression is conducted on the area of the two-dimensional plane (90) corresponding to the local area (p5).

11 Claims, 30 Drawing Sheets

U.S. PATENT DOCUMENTS

| | | | | |
|---|---|---|---|---|
| 4,645,459 | A | * | 2/1987 | Graf et al. ...................... 434/43 |
| 4,965,582 | A | * | 10/1990 | Hellsten ................... 342/25 A |
| 5,067,098 | A | * | 11/1991 | Moellering et al. ......... 345/426 |
| 5,357,484 | A | * | 10/1994 | Bates et al. .................. 367/118 |
| 5,452,406 | A | * | 9/1995 | Butler et al. ................ 345/426 |
| 5,552,787 | A | * | 9/1996 | Schuler et al. ............ 342/25 A |
| 5,604,820 | A | * | 2/1997 | Ono ........................... 382/190 |
| 5,631,981 | A | * | 5/1997 | Rao ........................... 382/278 |
| 5,671,136 | A | * | 9/1997 | Willhoit, Jr. .................. 702/18 |
| 5,825,188 | A | * | 10/1998 | Montgomery et al. ....... 324/357 |
| 5,923,278 | A | * | 7/1999 | Poehler et al. ............ 342/25 C |
| 6,011,505 | A | * | 1/2000 | Poehler et al. ............ 342/25 C |
| 6,073,079 | A | * | 6/2000 | Thomas ......................... 702/9 |
| 6,208,347 | B1 | * | 3/2001 | Migdal et al. ............... 345/419 |
| 6,272,448 | B1 | * | 8/2001 | Ishii ............................. 703/2 |
| 6,288,721 | B1 | * | 9/2001 | Donoghue et al. .......... 345/426 |
| 6,456,288 | B1 | * | 9/2002 | Brockway et al. ........... 345/428 |
| 6,539,126 | B1 | * | 3/2003 | Socolinsky et al. ......... 382/274 |
| 6,578,706 | B2 | * | 6/2003 | Thompson .................. 206/214 |
| 6,735,557 | B1 | * | 5/2004 | Castellar et al. ................ 703/5 |
| 6,778,698 | B1 | * | 8/2004 | Prakash et al. .............. 382/164 |
| 6,915,310 | B2 | * | 7/2005 | Gutierrez et al. ......... 707/104.1 |
| 6,985,606 | B1 | * | 1/2006 | Wilkinson .................. 382/109 |
| 6,989,841 | B2 | * | 1/2006 | Docherty .................... 345/629 |
| 7,151,545 | B2 | * | 12/2006 | Spicer ........................ 345/582 |
| 7,164,883 | B2 | * | 1/2007 | Rappaport et al. ......... 455/3.01 |
| 2003/0026762 | A1 | * | 2/2003 | Malmros et al. ............. 424/9.6 |
| 2003/0234781 | A1 | * | 12/2003 | Laidlaw et al. .............. 345/419 |
| 2004/0017385 | A1 | * | 1/2004 | Cosman et al. ............. 345/629 |
| 2004/0169617 | A1 | * | 9/2004 | Yelton et al. ................. 345/1.1 |
| 2004/0169663 | A1 | * | 9/2004 | Bernier ....................... 345/629 |

OTHER PUBLICATIONS

Kikukawa et al., "Solid Texturing o Riyo Shita 3-Jigen Nin'l Gamenjo ni Okeru Sensekibun Tatamikomiho", The Journal of the Institute of Image Electronics Engineers of Japan, Jul. 25, 2000, vol. 29, No. 4,translation and original document, pp. 1-3 and 283-291.*

Cabral, et al., "Imaging Vector Fields Using Line Integral Convolution", Proceedings of the 20th Annual Conference on Computer Graphics and interactive Techniques, SIGGRAPH '93, ACM, New York, NY, pp. 263-270.*

Helman, J.L.; Hesselink, L.; "Visualizing vector field topology in fluid flows", IEEE Computer Graphics and Applications, vol. 11, Issue 3, May 1991, pp. 36-46.*

Hotz, I., "Isometric embedding by surface reconstruction from distances", Proceedings of the Conference on Visualization '02, Oct. 27-Nov. 1, 2002, Visualization, IEEE Computer Society, Washington, DC, pp. 251-258.*

Interrante, V.; Grosch, C.; "Visualizing 3D flow", IEEE Computer Graphics and Applications, vol. 18, Issue 4, Jul.-Aug. 1998, pp. 49-53.*

Han-Wei Shen; Kao, D.L. "A new line integral convolution algorithm for visualizing time-varying flow fields", Transactions on Visualization and Computer Graphics, vol. 4, Issue: 2, Apr.-Jun. 1998, pp. 98-108.*

Han-Wei Shen; Johnson, C.R.; Kwan-Liu Ma; "Visualizing vector fields using line integral convolution and dye advection", Proceedings 1996 Symposium on Volume Visualization, Oct. 28-29, 1996, pp. 63-70, 102.*

R Yokoyama, M Shirasawa, Y Kikuchi, "Topographical Feature Representation by Openness Maps", International Symposium on Remote Sensing, 2000—register.itfind.or.kr, Google Scholar.*

Piper, B., Ratti, C., and Ishii, H. 2002. Illuminating clay: a 3-D tangible interface for landscape analysis. In Proceedings of the SIGCHI Conference on Human Factors in Computing Systems: Changing Our World, Changing Ourselves (Minneapolis, Minnesota, USA, Apr. 20-25, 2002). CHI '02. ACM, New York, NY, 355-362.*

C. L. Bajaj , V. Pascucci , D. R. Schikore, "Visualization of scalar topology for structural enhancement", Proceedings of the conference on Visualization '98, p. 51-58, Oct. 18-23, 1998, Research Triangle Park, North Carolina, United States.*

Ronald Peikert , Martin Roth, The "parallel vectors" operator: a vector field visualization primitive, Proceedings of the conference on Visualization '99: celebrating ten years, p. 263-270, Oct. 1999, San Francisco, California, United States.*

Turin, W.; Prabhu, V.K.; Kahn, A.L., "Shadowing algorithms in estimating ground scatter interference," IEEE International Conference on Communications, 1992, ICC '92, Conference record, SUPERCOMM/ICC '92, Discovering a New World of Communications, pp. 1478-1481, vol. 3, Jun. 14-18, 1992.*

Katsuyuki Shinohara et al., "Vector-Jo o Mochiita Gazo Kaiseki" ("Color Image Analysis by a Vector field"), ITEJ Technical Report, May 20, 1993, vol. 17, No. 28, pp. 11 to 16.

Makoto Kikukawa et al., "Solid Texturing o Riyo Shita 3-Jigen Nin'l Gamenjo ni Okeru Sensekibun Tatamikomiho", The Journal of the Institute of Image Electronics Engineers of Japan, Jul. 25, 2000, vol. 29, No. 4, pp. 283-291.

R. Yokoyama, M. Shirasawa and R. Pike, "Visualizing Topography by Openness: A New Application of Image Processing to Digital Elevation Models", Photogrammetric Engineering & Remote Sensing, Mar. 2002, vol. 68, No. 3, pp. 257-265.

R. Yokoyama, Michio Sirasawa and Yu Kikuchi, "Representation of Topographical Features by Opennesses", Department of Computer Science, Iwate University, 1999, vol. 38, No. 4, pp. 26-34.

Shinohara, K.. et al., Color Image Analysis by a Vector fields, ITE Technical Report, vol. 17, No. 28, May 20, 1993, pp. 11-16.

Shinohara, et al., "Color Image Analysis by a Vector Fields, ITEJ Technical Report", vol. 17, No. 28, May 20, 1993, pp. 11-16.

Kikukawa, et al.. "Line Integral Convolution on Arbitrary 3D Plane Using Solid Texturing", The Institute of Image Electronics Engineers of Japan. Paper and Material Abstracts vol. 29, No. 4, Jun. 2000.

* cited by examiner

C($\Psi m^-$)

D(Gm,R)

$E\ (\Psi m^-, Gm, R)$ $G(\Psi m^+, Gm, R)$

H ($\Psi$m, Gm, R, Ea)

CONDITION OF ARRANGEMENT OF SAMPLE POINTS ABOUT FOCUSED SAMPLE POINT (◎-MARK) IN UTM-DEM
●-MARKS DENOTE SAMPLE POINTS IN EIGHT AZIMUTHS, ○-MARKS DENOTE OTHER SAMPLE POINTS

Prior Art

FIG.15 ●: ABOVEGROUND OPENING AND UNDERGROUND OPENING OF FOCUSED
SAMPLE POINT (●-MARK) IN BASIC GEOGRAPHICAL FEATURES

Prior Art

| | BASIC GEOGRAPHICAL FEATURES | | ABOVEGROUND OPENING | UNDERGROUND OPENING |
|---|---|---|---|---|
| 1 | FLAT TERRAIN | | (MEDIUM) | (MEDIUM) |
| 2 | SUMMIT | | (VERY LARGE) | (VERY SMALL) |
| 3 | CONCAVE TERRAIN | | (VERY SMALL) | (VERY LARGE) |
| 4 | RIDGE EXTENDING NORTH-TO-SOUTH | | (LARGE) | (SMALL) |

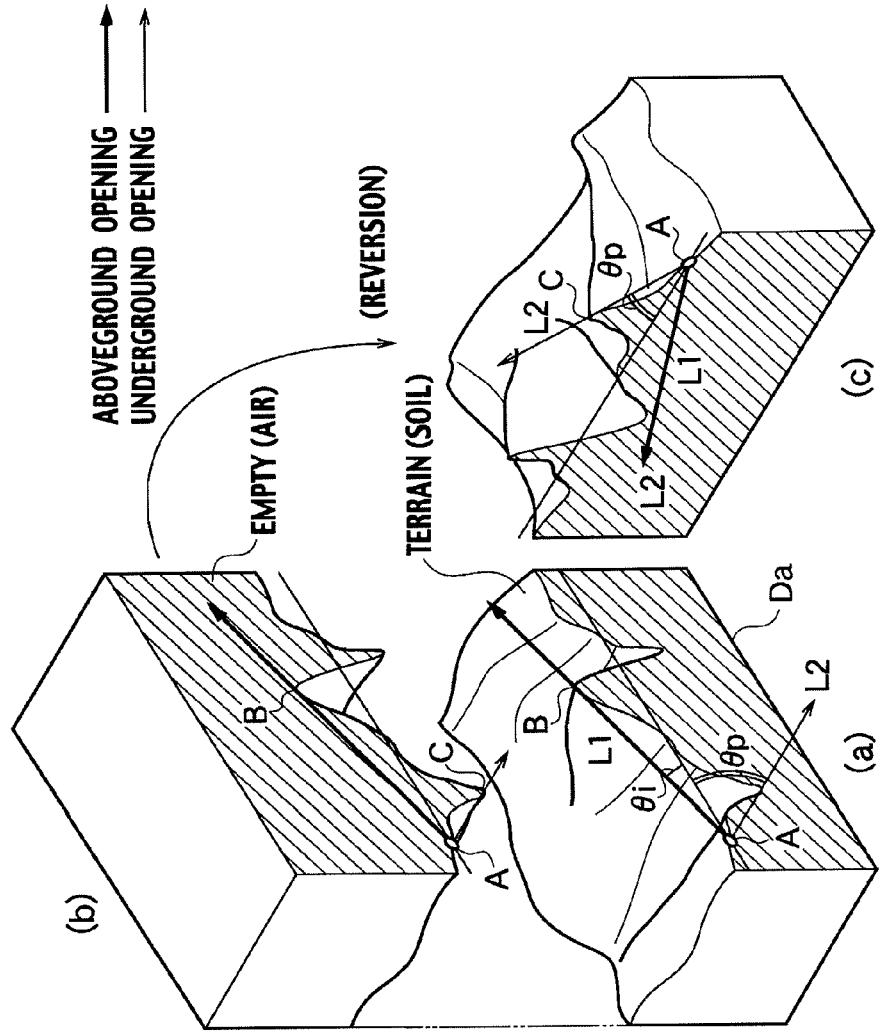

FIG.17
(a)
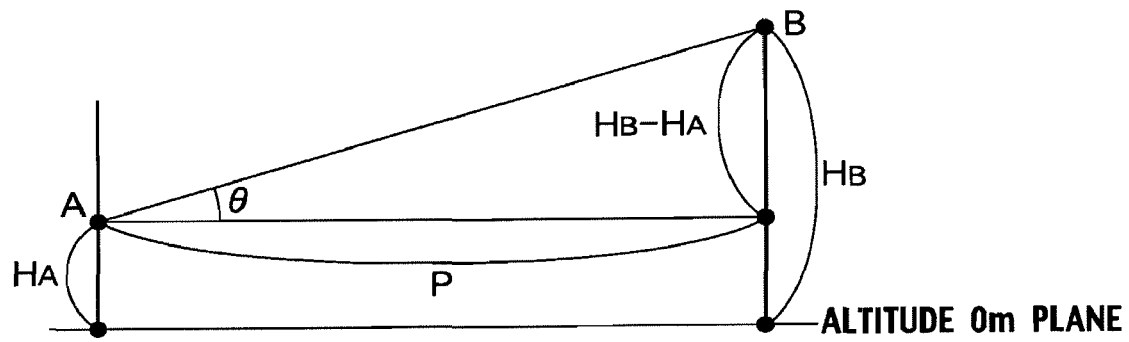
: ELEVATION ANGLE $\theta$ OF SAMPLE POINT A TO SAMPLE POINT B
(b)
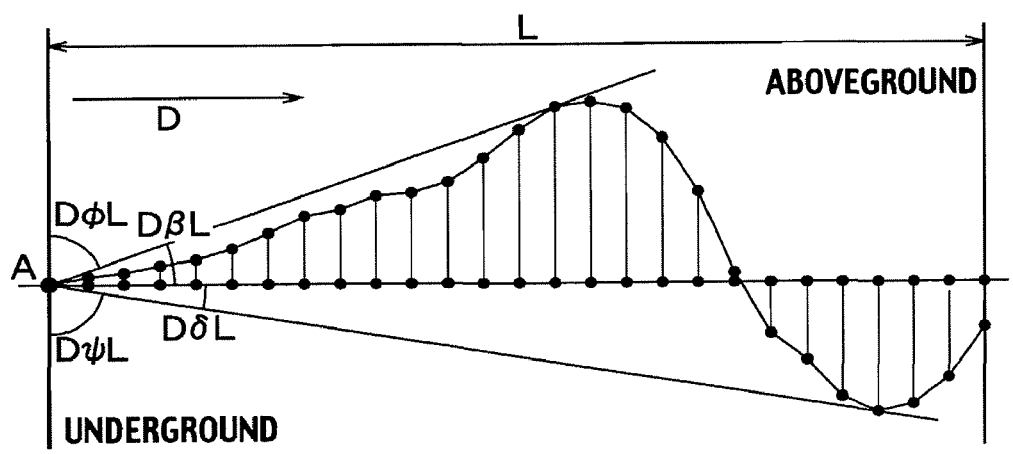
: ABOVEGROUND ANGLE AND UNDERGROUND ANGLE OF D-L SET OF SAMPLE POINT A
Prior Art

FIG.18
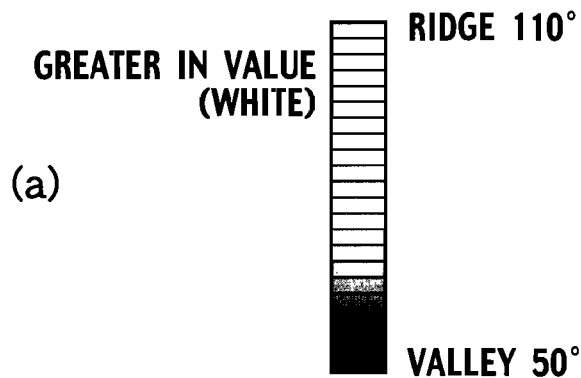
(a)
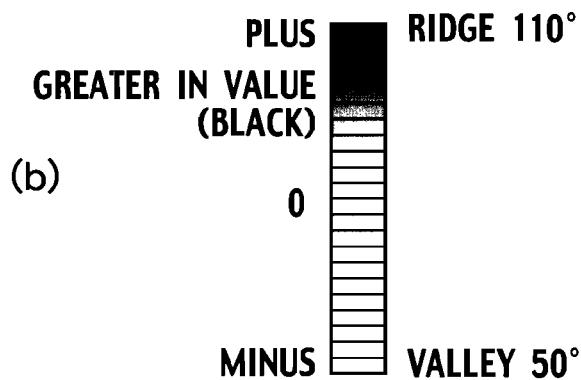
(b)
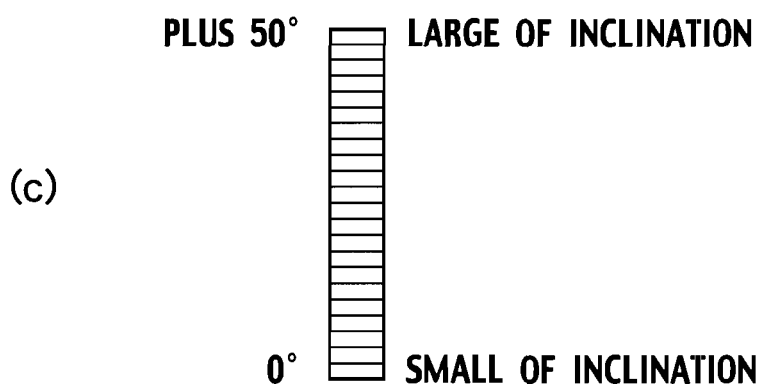
(c)

LASER STEREOSCOPIC IMAGE OF AOKIGAHARA LAVA FLOW
DISTRIBUTION REGION

GEOGRAPHIC FEATURE BY AERIAL MAPPING MEASUREMENT
WITH NO GLACIAL HOLE CRATER ROW INDICATED

LASER CONTOUR MAP

STEREOSCOPIC IMAGE

VISUALIZING SYSTEM, VISUALIZING METHOD, AND VISUALIZING PROGRAM

FIELD OF ART

The present invention relates to a visualization processing system, a visualization processing method, and a visualization processing program, and particularly, to a visualization processing system, a visualization processing method, and a visualization processing program which are adapted for visualization, in a manner that allows an intuitive visual perception (e.g. a manner that gives a visually solid appearance), on a substantially two-dimensional field of view (e.g. a flat or curved plane), of a vector field (e.g. a set of topographic data representing an earth's surface) including a distribution of three-dimensional vectors (e.g. stereoscopic topographic data) that have substantially three components indicated together, or three-dimensional vectors of specified three components of multi-dimensional vectors (e.g. such data that have stereoscopic topographic data and geologic data together).

The present invention further relates to a visualization processing system, a visualization processing method, and a visualization processing program which are adapted for an expression using a color tone, in place of contour lines, of altitude and inclination of concavo-convex part of terrain based on a great amount of digital image data represented by three-dimensional coordinates, to thereby generate a gradient-reddening stereoscopic image that can provide a visually solid appearance.

BACKGROUND ART

For a visualization of three-dimensional vector field on a two-dimensional plane, many attempts have been made since ancient times.

Most typically, there has been known a method of converting two components into coordinate values, and plotting an intersection thereof on a two-dimensional plane, providing each intersection with a note of attribute of the remaining third component (e.g. a town guide map), which however is unable to afford an easy grasp of a difference of the third component.

In this respect, there has been made also a graphic expression of an attributive feature of the third component (e.g. a town street guide map), which is still bound to the localization of information, and has covered successive changes in the attribute.

To this point, there has been generally employed a method of entering a continuous feature of two components (e.g. an outline such as of a coast, river, lake, or marsh) and attribute isopleth lines of the third component (e.g. contour lines), which is yet difficult of the intuitive visible perception of an attribute variation.

A topographic map is now supposed for more specific discussion.

In a mesh measurement by an analyzing mapper, the terrain is lattice-like divided, having altitude values given thereto, to provide a DEM (Digital Elevation Model) data. This is processed in a computer for calculation of parameters concerning, e.g, the terrain's heights, inclination angles, slope azimuths, laplacians, valley divisions, water systems, etc., allowing for a distribution of calculation results over a plane to be converted into a corresponding image.

In an airborne laser measurement, available data contain more detail information.

All the data is not involved in a topographic map.

For example, information on the height and inclilnation is extracted, to be entered as contour lines in the map. It however is uneasy to imagine a stereoscopic terrain therefrom.

There is also an image provided with a stereoscopic appearance, as a hill shade lighted from a diagonal upside, which has an emphasized inclination in a particular direction.

In this concern, there is a gray scale (tone of brightness) or a rainbow color (tone of hue) indicated in a terrain image, which allows an intuitive visual perception of termin's geometrical features and their distribution, and is useful, but unable to give an effective visually solid appearance.

Reference-1: "Japanese Patent Application Laying-Open Publication 1-46902"

There is also an image processed by using either an avobeground opening or an underground opening as a mega filter, which allows a capture of terrain's features in a relatively large district, but feels something missing in visually solid appearance, particularly in local appearances to be visually solid.

Reference-2: "Iwate University thesis: Indication of terrain features by an opening, the photogrammetry and remote sensing, by Ryuuzou Yokoyama, Michio Shirasawa, and Yutaka Kikuchi (1999), vo. 38, no. 4, 26-34".

Description is now made of conventional methods of providing a topographic map with a visually solid appearance.

(Stereo-Matching Image, Three-Dimensional Image)

Basically, an image that makes use of a parallax, employing two photographs. There are varieties of methods, such as cases by a red/blue filter, a polarizing filter, a diffraction grating, or a lenticurar lenz, any of which however has to be seen in a particular direction, and needs a glass. Moreover, expansion as well as scaling down is difficult.

The three-dimensional image is an image looked down in a particular direction, which is inadequate to read, as having a portion unseen if in shadow, looking small if distant, and lacking resolution if close. Moreover, time is necessary for image creation.

(Indication by Contour Lines)

The contour line is suitable to the indication of terrain in mountainous districts, but for steep inclinations (e.g. a sudden cliff part) or gentle slopes or flat lands (a plain part), the reading of topographic features takes a time due to an extreme convergence or divergence of contour lines having stepwise allotted heights.

The angle of inclination as well as the orientation is to be guessed from the variation of spacing between contour lines. Hence, being unfit in a simple expansion or scaling, it needs a remake in some case.

Crowded contour lines have their gaps lost, and are substituted by a legend of cliff. This task is complex, and constitutes an impediment to vectorization.

Small irregularity cannot be read unless a height is given to each contour line.

(Set of Image Data having Two-Dimensional Altitude Values)

In a mapping work by aerial photographic measurement, the acquisition of information is directly made of contour lines as connected particular altitudes, having no altitudes given between contour lines.

In the case of mesh measurement by an analyzing mapper or airborne laser measurement, the DEM data is acquired, and based thereon a two-dimensional distribution of contour lines is determined, whereby, although contour lines are smoothed as necessary, information else than finally contained in contour lines, e.g. information of a three-dimensional geometry between contour lines, is left unused.

This invention was made in view of the foregoing points.

It therefore is an object of the invention to provide a visualization processing system, a visualization processing method, and a visualization processing program, which are adapted to visualize a vector field, with local solid attributes thereof inclusive, on a substantially two-dimensional field of view, in a manner that allows an intuitive visible perception.

It also is an object of the invention to provide a visualization processing system, a visualization processing method, and a visualization processing program, which are adapted to generate a gradient reddening stereoscopic image that allows at a glance a stereoscopic grasp of terrain's heights and inclination degrees.

SUMMARY OF INVENTION

To achieve the object, a visualization processing system according to the invention is characterized by a first operator for mapping a vector field in a three-dimensional coordinate space to obtain a corresponding sequence of coordinate points, a second operator for determining an elevation degree in a local region of a plane connecting the sequence of coordinate points, a third operator for determining a depression degree in the local region of the plane connecting the sequence of coordinate points, a fourth operator for synthesizing the elevation degree and the depression degree in a weighting manner to determine an elevation-depression degree in the local region of the plane connecting the sequence of coordinate points, and a fifth operator for mapping the coordinate space on a two-dimensional plane, providing a tone indication commensurate with the elevation-depression degree to a region on the two-dimensional plane corresponding to a divided region of the plane connecting the sequence of coordinate points.

According to the invention, a vector field is mapped in a three-dimensional coordinate space, obtaining a corresponding sequence of coordinate points, and there are determined in a local region of a plane connecting the sequence of coordinate points an elevation degree, that is a rising tendency (e.g. a ridge shaping tendency in a topographic map), and a depression degree, that is a sinking tendency (e.g. a valley shaping tendency in a topographic map), which are synthesized in an end-fit weighting manner (in a broad sense inclusive of the difference), determining in the local region an elevation-depression degree, that is a rising and sinking tendency (e.g. a ridge-valley shaping tendency in a topographic map), which is tone-indicated in a corresponding region on a two-dimensional plane, so that the vector field can be visualized, with its local solid attributes inclusive, on a substantially two-dimensional plane in a manner that allows an intuitive visible perception.

The elevation degree may preferably be defined in terms of a solid angle at one side in the local region of the plane connecting the sequence of coordinate points.

The depression degree may preferably be defined in terms of a solid angle at the other side in the local region of the plane connecting the sequence of coordinate points.

The visualization processing system may preferably further comprise a sixth operator for determining an inclination distribution of the plane connecting the sequence of coordinate points, and the fifth operator may preferably provide on the two-dimensional plane a color-toned indication, i.e. chroma saturation indication, of the inclination distribution (more preferably, in reddish colors), and for a brightness thereof, give the tone indication.

The visualization processing system may preferably further comprise a seventh operator for connecting, among the sequence of coordinate points, those coordinate points equivalent of an attribute in the vector field to obtain an attribute isopleth line, and an eighth operator for mapping the attribute isopleth line on the two-dimensional plane given the tone indication.

A visualization processing method according to the invention is characterized by a first step of mapping a vector field in a three-dimensional coordinate space to obtain a corresponding sequence of coordinate points, a second step of determining an elevation degree in a local region of a plane connecting the sequence of coordinate points, a third step of determining a depression degree in the local region of the plane connecting the sequence of coordinate points, a fourth step of synthesizing the elevation degree and the depression degree in a weighting manner to determine an elevation-depression degree in the local region of the plane connecting the sequence of coordinate points, and a fifth step of mapping the coordinate space on a two-dimensional plane, providing a tone indication of the elevation-depression degree to a region on the two-dimensional plane corresponding to a divided region of the plane connecting the sequence of coordinate points.

A visualization processing program according to the invention is characterized in that the program is functionable to have a computer execute a first process for mapping a vector field in a three-dimensional coordinate space to obtain a corresponding sequence of coordinate points, a second process for determining an elevation degree in a local region of a plane connecting the sequence of coordinate points, a third process for determining a depression degree in the local region of the plane connecting the sequence of coordinate points, a fourth process for synthesizing the elevation degree and the depression degree in a weighting manner to determine an elevation-depression degree in the local region of the plane connecting the sequence of coordinate points, and a fifth process for mapping the coordinate space on a two-dimensional plane, providing a tone indication of the elevation-depression degree to a region on the two-dimensional plane corresponding to a divided region of the plane connecting the sequence of coordinate points.

According to the invention, a visualization processing system for generating a gradient reddening stereoscopic image is characterized by a database having stored therein a multiplicity of digital data provided with three-dimensional coordinates, and a computer which comprises a means for generating a stereoscopic contour image having contour lines connecting three-dimensional coordinates of digital data having identical Z values, a means for meshing intervals between contour lines, a means for allocating focused points to meshes, determining an average of differences in Z value between a respective mesh given a focused point and neighboring meshes, a means for generating a gradient reddening image having assigned to the mesh given the focused point a red tone commensurate with a degree in magnitude of a difference of the average, a means for generating a gray scale image having a varied brightness depending on a ridge-valley shaping tendency of the mesh given the focused point, and a means for performing a multiplying synthesis of the gradient reddening image and the gray scale image, to display on a screen a gradient reddening stereoscopic image representing degrees of gradient and degrees of height in color.

According to the invention, a visualization processing method for generating a gradient reddening stereoscopic image is characterized by a step of generating a stereoscopic contour image having contour lines connecting three-dimensional coordinates of digital data having identical Z values, a step of meshing intervals between contour lines, a step of allocating focused points to meshes, determining an average of differences in Z value between a respective mesh given a focused point and neighboring meshes, a step of generating a gradient reddening image having assigned to the mesh given the focused point a red tone commensurate with a degree in magnitude of a difference of the average, a step of generating a gray scale image having a varied brightness depending on a ridge-valley shaping tendency of the mesh given the focused point, and a step of performing a multiplying synthesis of the gradient reddening image and the gray scale image, to display on a screen a gradient reddening stereoscopic image representing degrees of gradient and degrees of height in color.

According to the invention, a visualization processing program for generating a gradient reddening stereoscopic image is characterized in that the program is adapted to have a computer function as a means for reading a multiplicity of digital data provided with three-dimensional coordinates, a means for generating a stereoscopic contour image having contour lines connecting three-dimensional coordinates of digital data having identical Z values, a means for meshing intervals between contour lines, a means for allocating focused points to meshes, determining an average of differences in Z value between a respective mesh given a focused point and neighboring meshes, a means for generating a gradient reddening image having assigned to the mesh given the focused point a red tone commensurate with a degree in magnitude of a difference of the average, a means for generating a gray scale image having a varied brightness depending on a ridge-valley shaping tendency of the mesh given the focused point, and a means for performing a multiplying synthesis of the gradient reddening image and the gray scale image, to display on a screen a gradient reddening stereoscopic image representing degrees of gradient and degrees of height in color.

BRIEF DESCRIPTION OF THE DRAWINGS

The above and further features, functions, and effects of the invention become more apparent from the following description of best modes for carrying out the invention, when the same is read in conjunction with the accompanying drawings, in which:

FIG. 15 is a diagram illustrating principal patterns of aboveground opening and underground opening in the visualization processing system of FIG. 11;

FIG. 16 is a stereoscopic illustration of an aboveground opening and an underground opening in the visualization processing system of FIG. 11;

FIG. 17 is a diagram illustrating a sample point and a distance of aboveground opening and underground opening in the visualization processing system of FIG. 11;

FIG. 18 is a diagram illustrating gray scale allocation in the visualization processing system of FIG. 11;

BEST MODES FOR CARRYING OUT THE INVENTION

There will be described below best modes for carrying out the invention.

First Mode of the Embodiment

Figure 1:
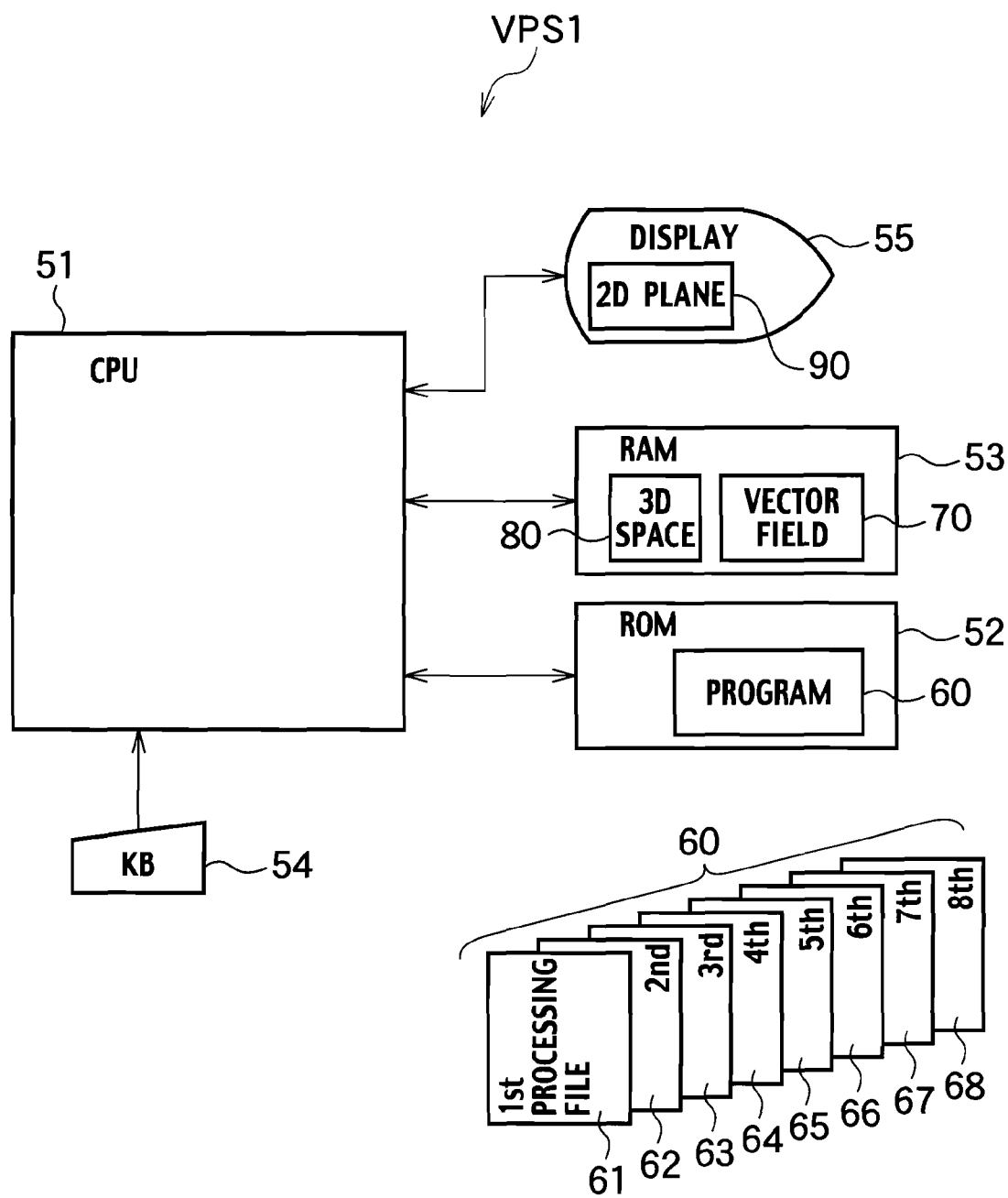
FIG. 1 is a block diagram of a visualization processing system according to a first mode of embodiment of the invention.

First, description is made of a first mode of embodiment of the invention, with reference to FIG. 1 to FIG. 10. FIG. 1 is a block diagram of a visualization processing system VPS1 according to this mode of embodiment, FIG. 2, a flowchart showing process procedures P1 to P8 and process results A to I of the system VPS1, and FIG. 3 to FIG. 10, details of principal process results A to H, respectively.

As shown in FIG. 1, the visualization processing system VPS1 has a central information processing unit (CPU) 51 composed as an adequate combination of a workstation, a processor, or a microcomputer, and logics, registers, etc., an information input section 54 including a keyboard (KB), a mouse, interactive software switches, external communication channels, etc., for inputting necessary control and/or operational information to the central information processing unit 51, an information output section 55 including a display, a printer, external communication channels, etc., for performing indication and/or transmission, in a wide sense, of information output from the central information processing unit 51, a first memory 52 such as a read-only memory (ROM) having stored therein an operating system, application programs, and the like to be read to the central information processing unit 51, and a second memory 53 such as a random access memory (RAM) for storing information to be occasionally processed in the central information processing unit 51 as well as information occasionally written from the central information processing unit 51. The first and second memories 52, 53 may preferably be integrated or subdivided in a suitable manner.

The first memory 52 has stored therein a visualization processing program 60 operable on a prescribed application. In this mode of embodiment, the visualization processing program 60 is composed of a first to an eighth processing file 61 to 68 including program groups to be read in the central information processing unit 51, where they are adapted to execute eight visualization processes P1 to P8 shown in FIG. 2, respectively, while the classification and allocation of those program groups can be set in a voluntary manner.

In the second memory 53 is stored a vector field 70 constituting an object of process of the visual processing program 60. The vector field 70 may be a finite set of (a total number of N) information vectors having one or more components allowing extraction of substantially three or more kinds of information. In this mode of embodiment, each vector is given as a two-component vector that contains, for a focused point representing a minute finite-division region of a ground surface of Mt. Fuji, an identification (Id) number allowing confirmation to be made of information on the latitude and information on the longitude by a reference table, and a height difference relative to a neighboring focused point or reference point of triangulation.

Figure 2:
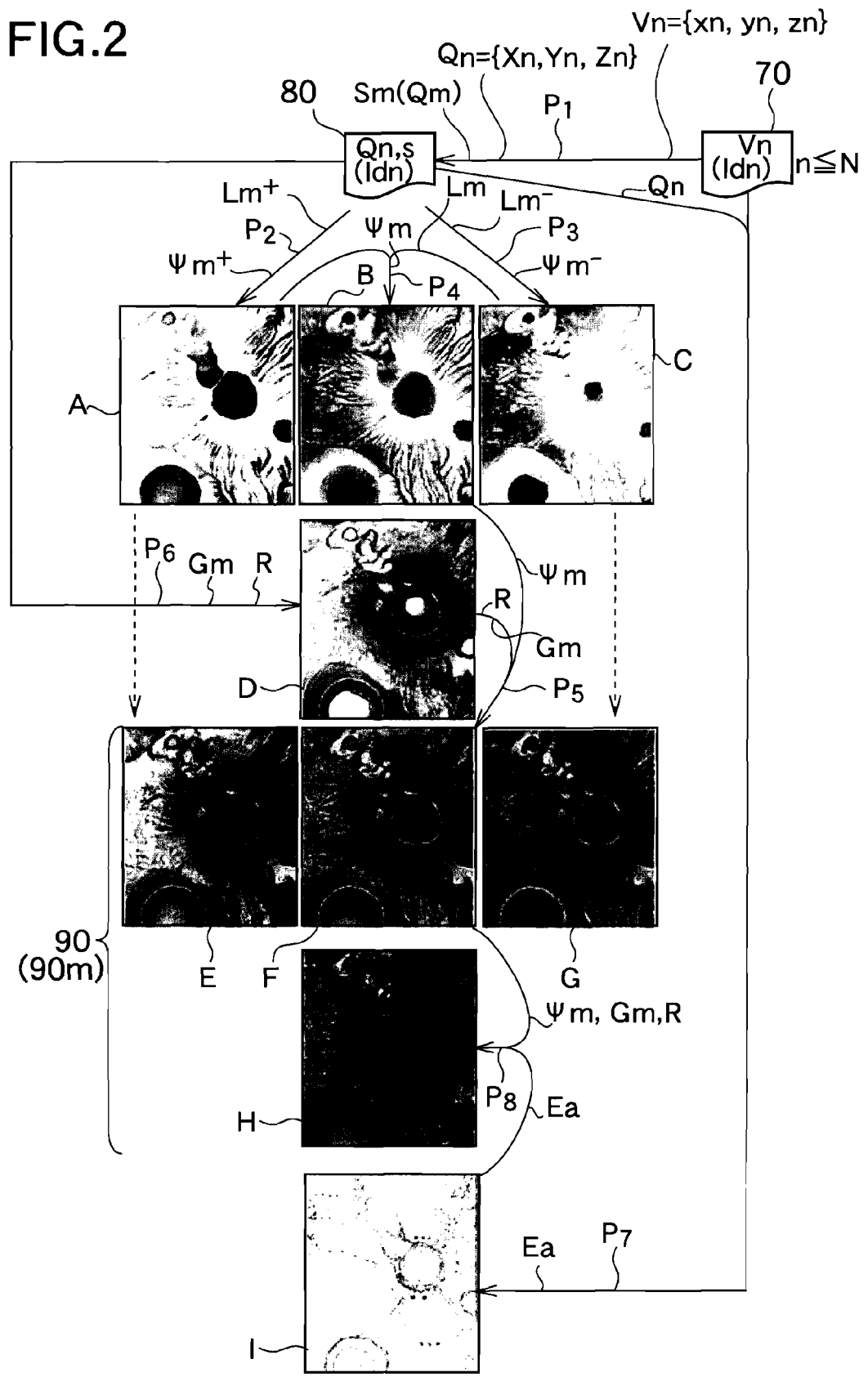
FIG. 2 is a flowchart showing a processing procedure and process results of the visualization processing system of FIG. 1.

The first processing file 61 is adapted to calculate, from an identification number $Id_n$ and a height difference of a two-component vector $V_n$ processed as an n-th (n=1 to N), the longitude $x_n$, latitude $y_n$, and sea level altitude $z_n$, and associate their values with a corresponding coordinate point $Q_n=\{X_n=x_n, Y_n=y_n, Z_n=z_n\}$ in a virtual three-dimensional (3D) X-Y-Z orthogonal coordinate space 80 stored in the second memory 53, i.e., store the identification number Id of the vector $V_n$ in a storage region in the memory 53 correspondent to the coordinate point $Q_n$, to thereby map the vector $V_n$ into the coordinate space 80. This is made for the total number of N vectors, whereby the vector field 70 is mapped in the coordinate space 80 (FIG. 2, process P1).

The first processing file 61 is further adapted to determine by the method of least squares or the like a curved plane S connecting with a necessary smoothness a sequence of a total number of N or an adequate smaller number of Id-numbered coordinate points $\{Q_n: n \leq N\}$ within the coordinate space 80, divide it into a total number of M $\{M \leq N\}$ minute plane regions $\{S_m: m \leq M\}$, defining their focused points $Q_m$, and store relevant information in the memory 53.

Figure 3:
FIG. 3 is a detail of part A of the flowchart of FIG. 2.

A second processing file 62 is adapted to verify, for a respective plane region $S_m$, a local region $L_m^+$ at an obverse side (Z+ side) of the curved plane S residing within a prescribed radius from a focused point $Q_m$ thereof, and determine a degree of openness defined thereby (i.e. a see-through solid angle to the heaven end or a second-order differential value equivalent thereto) $\Psi_m^+$ about the focused point $Q_m$ (FIG. 2, process P2), storing it as an elevation degree of the plane region $S_m$. FIG. 3 shows, as a process result A, an image in which the elevation degree $\Psi_m^+$ is tone-indicated over an entirety of the curved plane S. This image A clearly indicates a ridge side of terrain, i.e., a convexity (of the curved plane S) like an evident convexity.

Figure 5:
FIG. 5 is a detail of part C of the flowchart of FIG. 2.

A third processing file 63 is adapted to verify, for the plane region $S_m$, a local region $L_m^-$ at a reverse side (Z− side) of the curved plane S residing within the prescribed radius from the focused point $Q_m$, and determine a degree of openness defined thereby (i.e. a see-through solid angle to the earth end or a second-order differential value equivalent thereto) $\Psi_m^-$ about the focused point $Q_m$ (FIG. 2, process P3), storing it as a depression degree of the plane region $S_m$. FIG. 5 shows, as a process result C, an image in which the depression degree $\Psi_m^-$ is tone-indicated over an entirety of the curved plane S. This image C clearly indicates a valley side of terrain, i.e., a concavity (of the curved plane S) like an evident concavity. It should be noted that this image C does not constitute a simple reverse of the image A.

Figure 4:
FIG. 4 is a detail of part B of the flowchart of FIG. 2.

A fourth processing file 64 is adapted to synthesize, for the plane region $S_m$, the elevation degree $\Psi_m^+$ and the depression degree $\Psi_m^-$ in a weighting manner $(w^+\Psi_m^+ + w^-\Psi_m^-)$ with a sharing proportion $w^+:w^-(w^++w^-=0)$ determined in an end-fit manner (that is, depending on which of ridge and valley is to be put above), thereby determining a stereoscopic effect to be brought about the focused point $Q_m$ by a local region $L_m$ $(L_m^+, L_m^-)$ at obverse and reverse of the curved plane S residing within the prescribed radius (FIG. 2, process P4), storing it as an elevation-depression degree $\Psi_m$ of the plane region $S_m$. FIG. 4 shows, as a process result B, an image in which the elevation-depression degree $\Psi_m$ is tone-indicated over an entirety of the curved plane S. This image B clearly indicates a convexity (of the curved plane S) like an evident convexity, and a concavity like an evident concavity, thereby defining ridge and valley of terrain, with an intensified visually solid feeling. It is noted, for the image B, the weighting in synthesis is $w^+=-w^-=1$.

Figure 6:
FIG. 6 is a detail of part D of the flowchart of FIG. 2.

Description is now made of a sixth processing file 66. This file 66 is adapted to determine, for the plane region $S_m$, a maximum degree of inclination $G_m$ thereof (or a first-order differential value equivalent thereto) directly or indirectly via the method of least squares (FIG. 2, process P6), storing it as an inclination $G_m$ of the plane region $S_m$. FIG. 6 shows, as a process result D, (an achromatic indication image of) an image in which the inclination $G_m$ is color-toned to be indicated in a red-spectral color R over an entirety of the curved plane S. This image D also has the effect of visually projecting a stereoscopic appearance of terrain (that is the curved plane S).

Figure 8:
FIG. 8 is a detail of part F of the flowchart of FIG. 2.

A fifth processing file 65 is adapted for mapping (FIG. 2, process P5) the three-dimensional coordinate space 80, together with relevant information thereof $(\Psi_m, G_m, R)$, onto a two-dimensional plane 90 in the information output section 55, to thereby provide, to a region $90_m$ on the two-dimensional plane 90 corresponding to the region $S_m$ as a division of the plane S connecting a sequence of coordinate points $Q_m$, an R color-toned indication of the inclination $G_m$, and for a brightness of the R color tone, a tone indication commensurate with the elevation-depression degree $\Psi_m$. FIG. 8 shows, as a process result F. (an achromatic indication image of) this image. In this image F. terrain (that is the curved plane S) has a visually solid appearance.

Figure 7:
FIG. 7 is a detail of part E of the flowchart of FIG. 2.

An image E of FIG. 7 shows a result of a mapping (process P5), by the processing file 65 onto the two-dimensional plane 90, of information on the image D (i.e. R color tone indication of inclination $G_m$) and information on elevation-depression degrees (i.e. elevation degrees $\Psi_m^+$) corresponding to the image A, where ridge part is emphasized.

Figure 9:
FIG. 9 is a detail of part G of the flowchart of FIG. 2.

An image G of FIG. 9 shows a result of a mapping (process P5), by the processing file 65 onto the two-dimensional plane 90, of information on the image D (i.e. R color tone indication of inclination $G_m$) and information on elevation-depression degrees (i.e. depression degrees $\Psi_m^-$) corresponding to the image C, where valley part is emphasized.

A seventh processing file 67 is adapted to determine attribute isopleth lines (in this mode of embodiment, terrain's isometric contour lines and shape contour lines) Ea connecting, among the sequence of coordinate points $Q_n$, those coordinate points $Q_n$ equivalent of an attribute (in this mode of embodiment, sea level altitude $z_n$) extracted from components of vectors $V_n$ of the vector 70 field, storing them, and to output or indicate, as necessary (FIG. 2, process P7). FIG. 2 shows an indication process result I of the same. This result I also contributes to the grasp of a stereoscopic configuration of terrain (that is the curved plane S).

Figure 10:
FIG. 10 is a detail of part H of the flowchart of FIG. 2.

The eighth processing file 68 is adapted to map or output for display the three-dimensional space 80, together with relevant information ($\Psi_m$, $G_m$, R) hereof, onto the two-dimensional plane 90, mapping or outputting for display the attribute isopleth lines Ea (FIG. 2, process P8). FIG. 10 shows, as a process result H, (an achromatic indication image of) a display image of the same. In this image H also, terrain (that is the curved plane S) has a visually solid appearance.

Therefore, the visualization processing system VPS1 according to this mode of embodiment comprises a first operator (61) for mapping a vector field 70 in a three-dimensional coordinate space 80 to obtain a corresponding sequence of coordinate points $Q_m$, a second operator (62) for determining an elevation degree $\Psi_m^+$ in a local region $L_m^+$ of a plane S connecting the sequence of coordinate points, a third operator (63) for determining a depression degree $\Psi_m^-$ in a local region $L_m^-$ of the plane S connecting the sequence of coordinate points, a fourth operator (64) for synthesizing the elevation degree and the depression degree in a weighting manner to determine an elevation-depression degree $\Psi_m$ in a local region $L_m$ of the plane S connecting the sequence of coordinate points, and a fifth operator (65) for mapping the coordinate space 80 on a two-dimensional plane 90, providing a tone indication commensurate with the elevation-depression degree to a region $90_m$ on the two-dimensional plane 90 corresponding to a divided region $S_m$ of the plane S connecting the sequence of coordinate points. The operator means herein an element, a set thereof, or a means for executing an operation process command or operation process function programmed or set in advance.

The visualization processing system VPS1 further comprises a sixth operator (66) for determining an inclination $G_m$ distribution of the plane S connecting the sequence of coordinate points, and the fifth operator (65) is adapted to provide on the two-dimensional plane 90 a color-toned indication of the inclination distribution, in a red spectral color R, and for a brightness thereof, give the tone indication.

The visualization processing system VPS1 further comprises a seventh operator (67) for connecting, among the sequence of coordinate points, those coordinate points equivalent of an attribute in the vector 70 field to obtain attribute isopleth lines Ea, and an eighth operator (68) for mapping the attribute isopleth lines Ea on the two-dimensional plane 90 given the tone indication.

According to this mode of embodiment, a vector field 70 can be visualized on a substantially two-dimensional plane 90 in a manner that allows an intuitive visual perception, with a local stereoscopic attribute thereof inclusive.

A visualization processing method according to this mode of embodiment comprises a first step P1 of mapping a vector field in a three-dimensional coordinate space to obtain a corresponding sequence of coordinate points, a second step P2 of determining an elevation degree in a local region of a plane connecting the sequence of coordinate points, a third step P3 of determining a depression degree in the local region of the plane connecting the sequence of coordinate points, a fourth step P4 of synthesizing the elevation degree and the depression degree in a weighting manner to determine an elevation-depression degree in the local region of the plane connecting the sequence of coordinate points, and a fifth step P5 of mapping the coordinate space on a two-dimensional plane, providing a tone indication of the elevation-depression degree to a region on the two-dimensional plane corresponding to a divided region of the plane connecting the sequence of coordinate points.

A visualization processing program 60 according to this mode of embodiment is functionable to have a central information processing unit 51 execute a first process P1 for mapping a vector field in a three-dimensional coordinate space to obtain a corresponding sequence of coordinate points, a second process P2 for determining an elevation degree in a local region of a plane connecting the sequence of coordinate points, a third process P3 for determining a depression degree in the local region of the plane connecting the sequence of coordinate points, a fourth process P4 for synthesizing the elevation degree and the depression degree in a weighting manner to determine an elevation-depression degree in the local region of the plane connecting the sequence of coordinate points, and a fifth process P5 for mapping the coordinate space on a two-dimensional plane, providing a tone indication of the elevation-depression degree to a region on the two-dimensional plane corresponding to a divided region of the plane connecting the sequence of coordinate points.

SECOND MODE OF EMBODIMENT

Next, description is made of a second mode of embodiment of the invention, with reference to FIG. 11 to FIG. 28.

Figure 11:
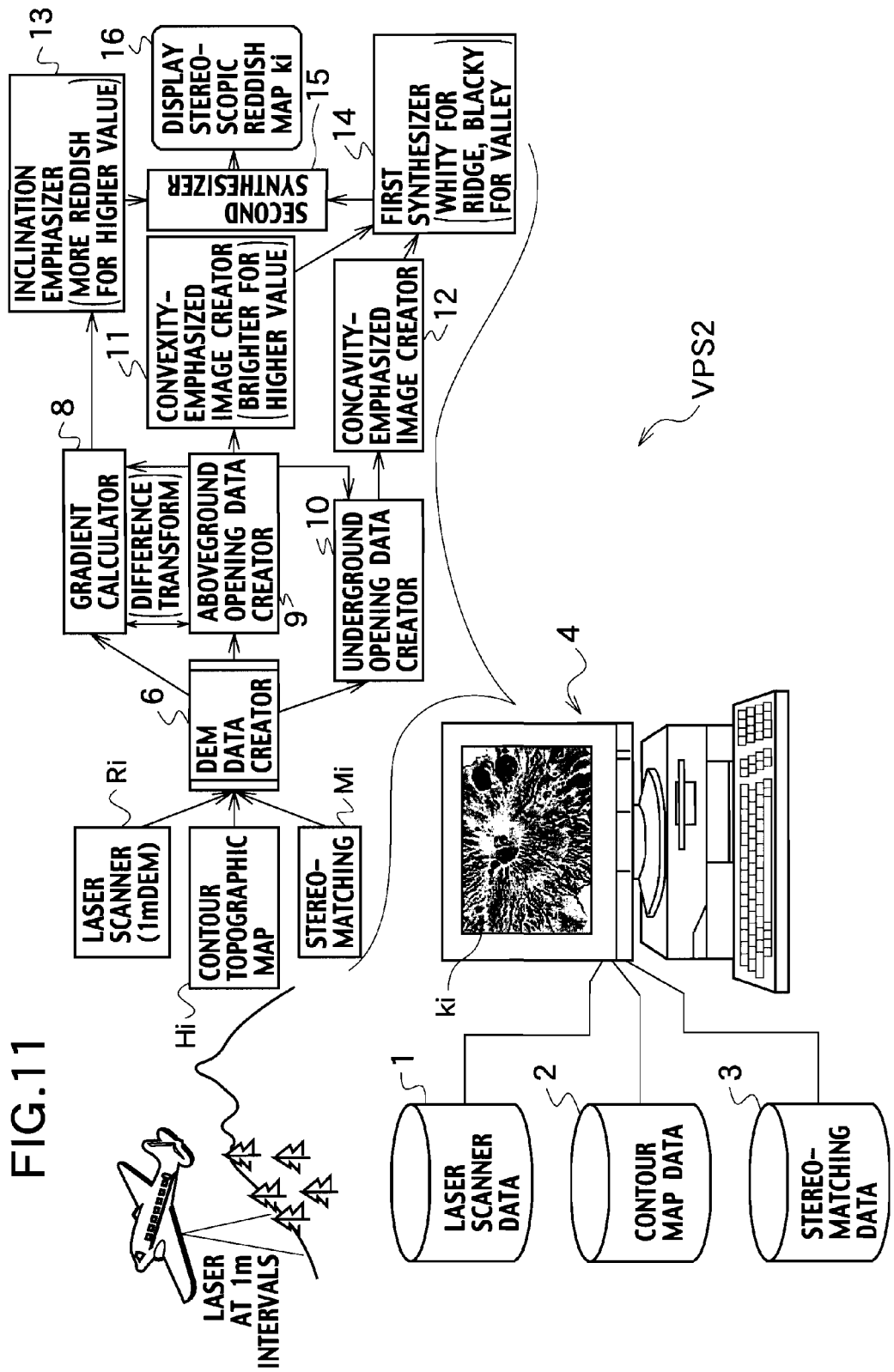
FIG. 11 is a block diagram of a visualization processing system for generating a gradient reddening stereoscopic image according to a second mode of embodiment of the invention.
Figure 12:
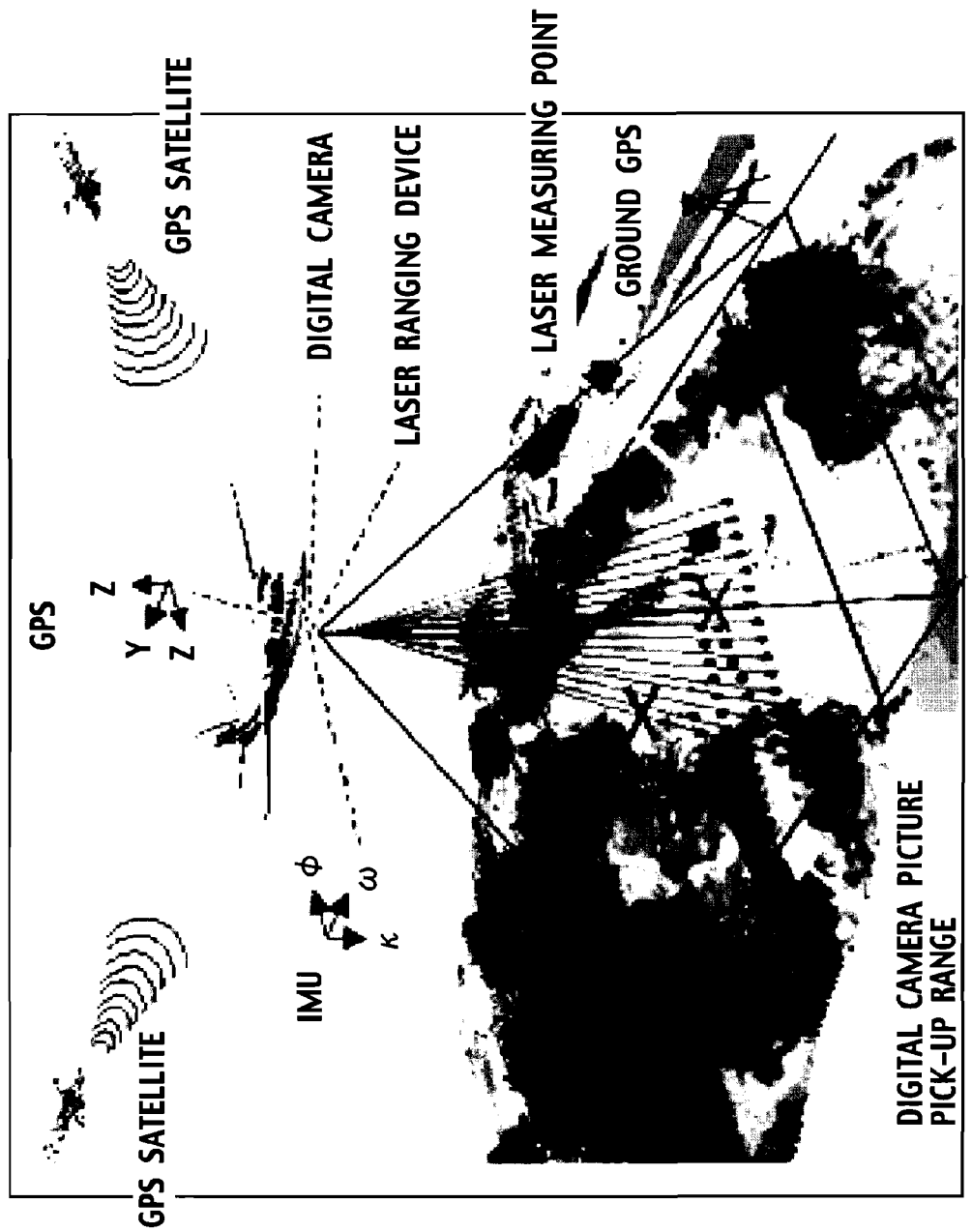
FIG. 12 is an illustration of a laser measurement in the visualization processing system of FIG. 11.
Figure 13:
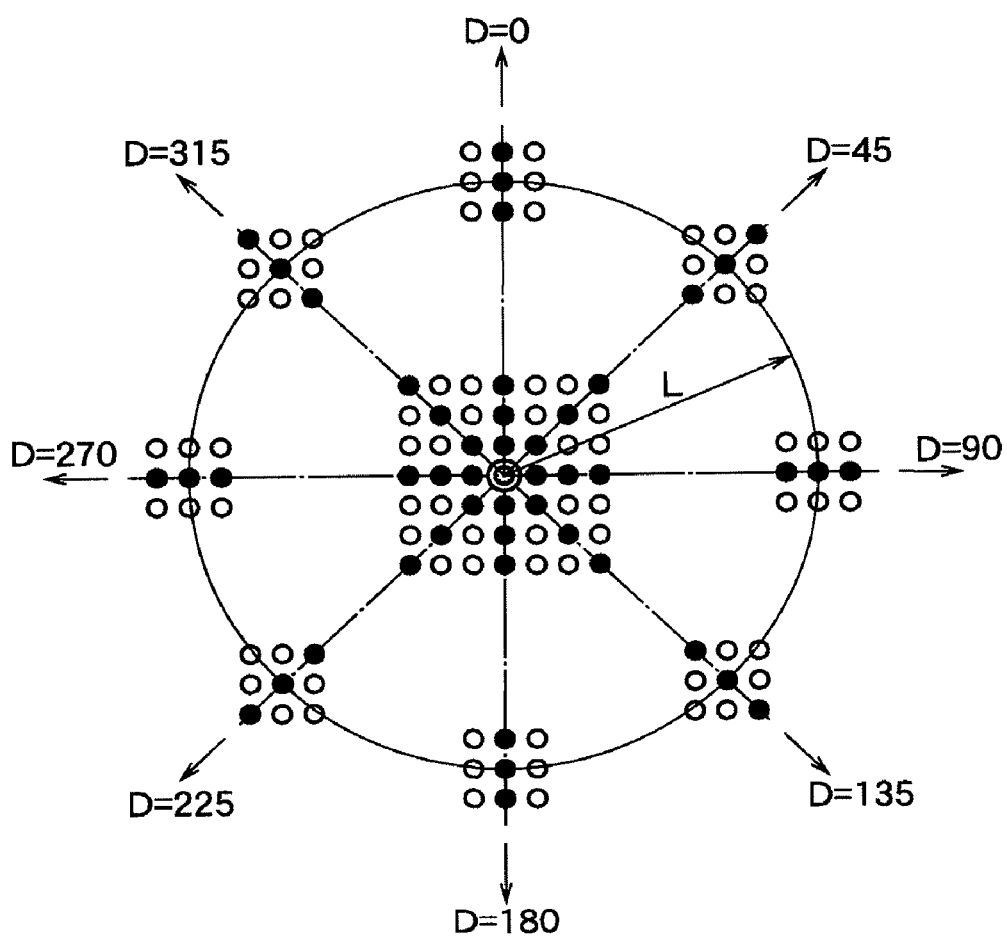
FIG. 13 is an illustration of an eight-directional array in the visualization processing system of FIG. 11.
Figure 14:
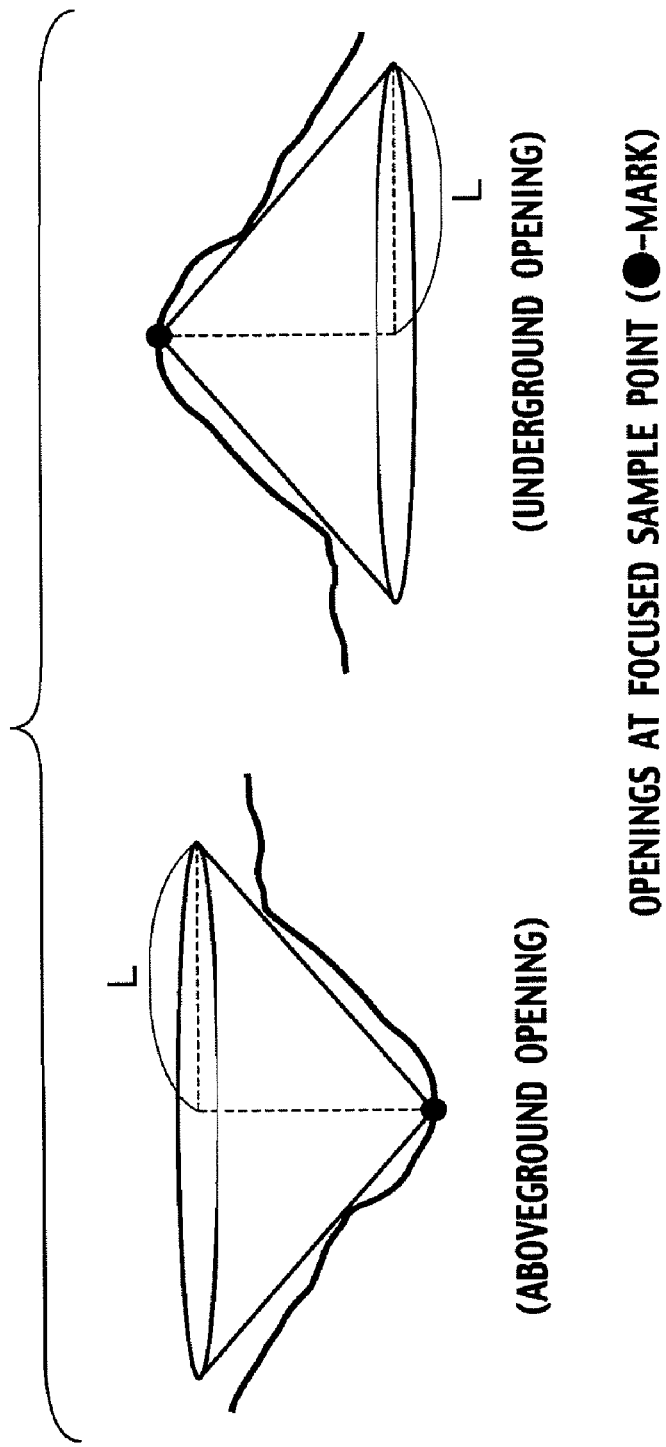
FIG. 14 is an illustration of principles of an aboveground opening and an underground opening in the visualization processing system of FIG. 11.
Figure 19:
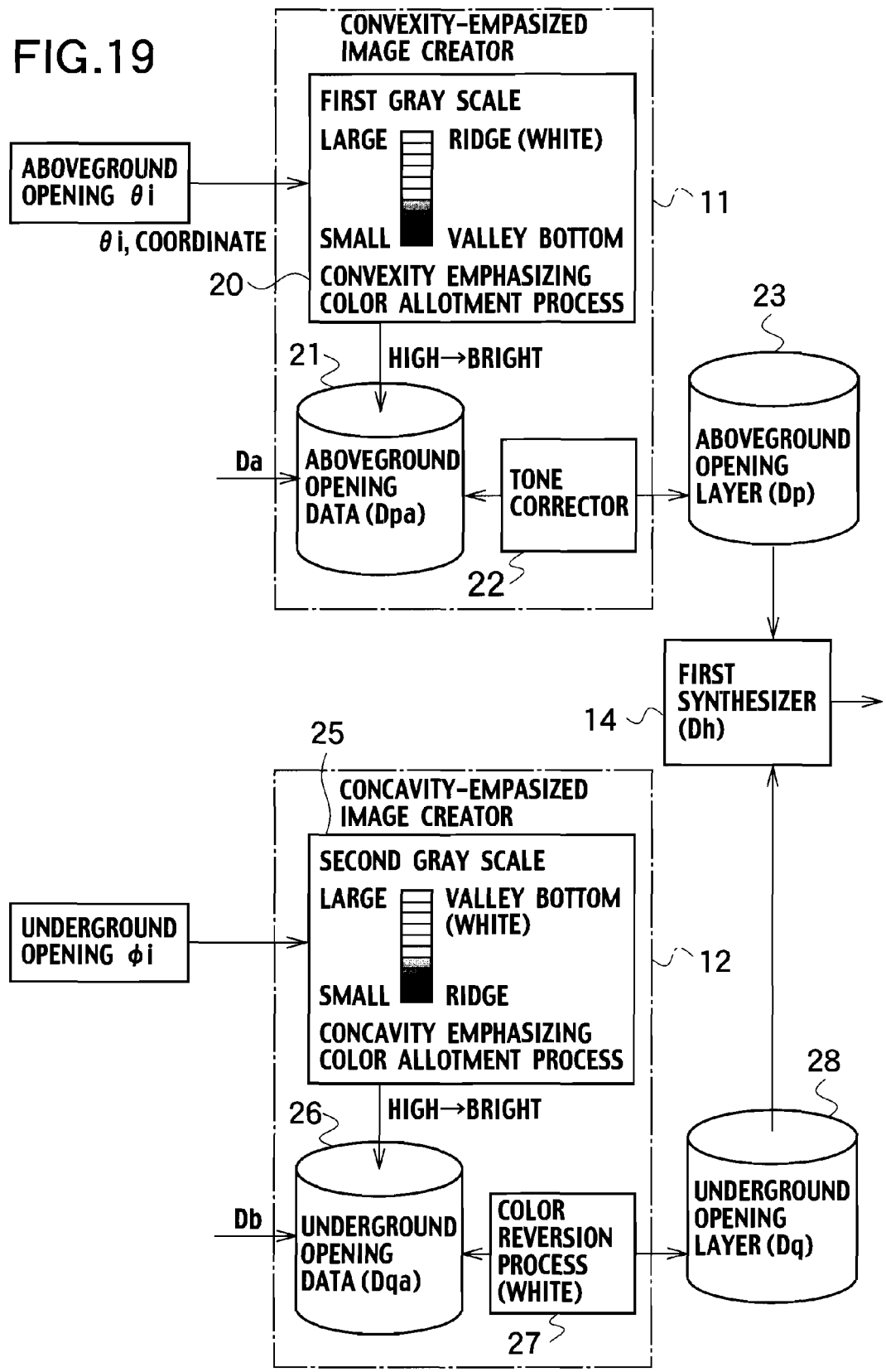
FIG. 19 is a block diagram of an convexity-emphasized image creator, a concavity-emphasized image creator, and a first synthesizer of the visualization processing system of FIG. 11.
Figure 20:
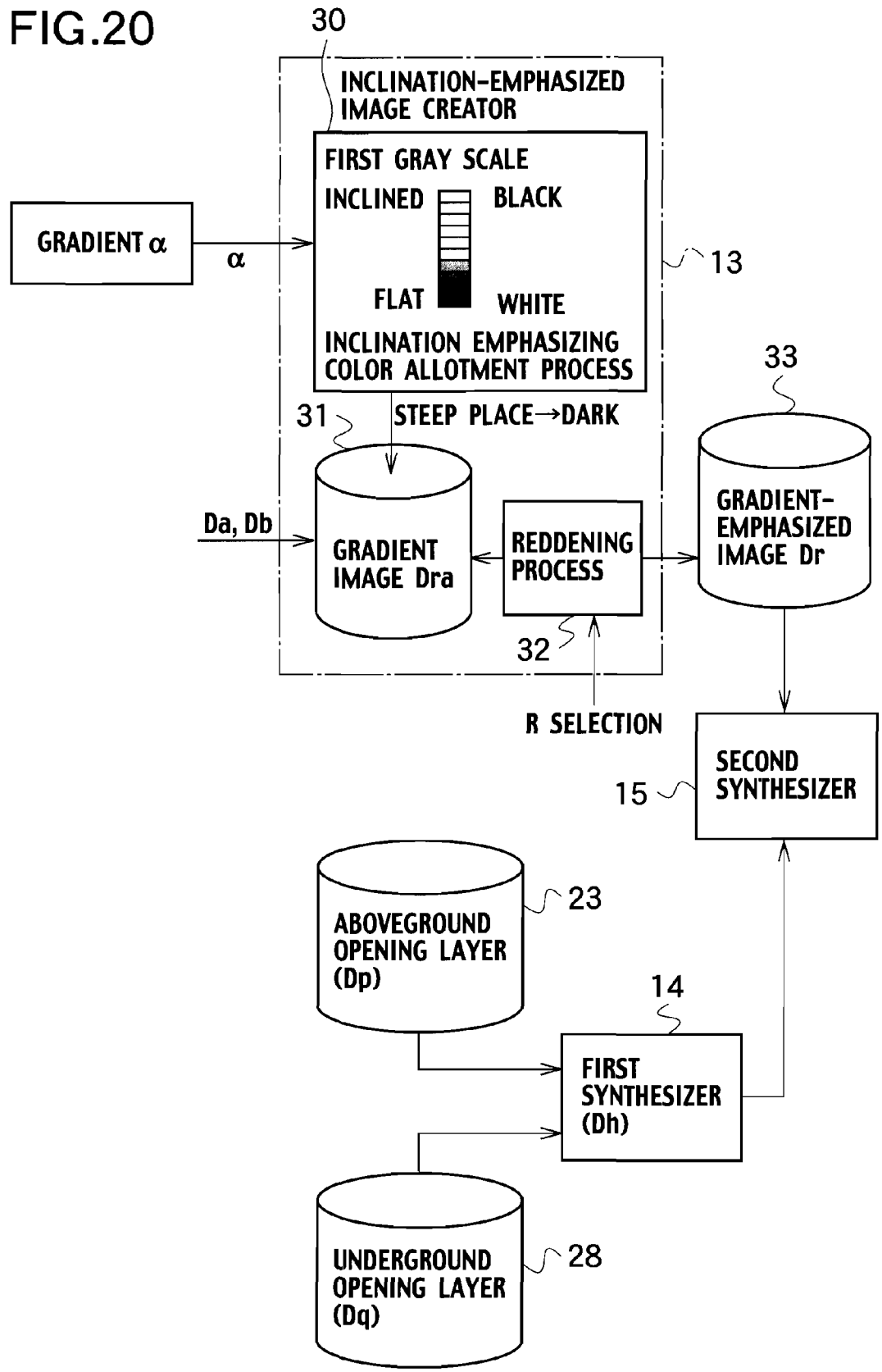
FIG. 20 is a block diagram of an inclination-emphasized image creator, and a second synthesizer of the visualization processing system of FIG. 11.
Figure 21:
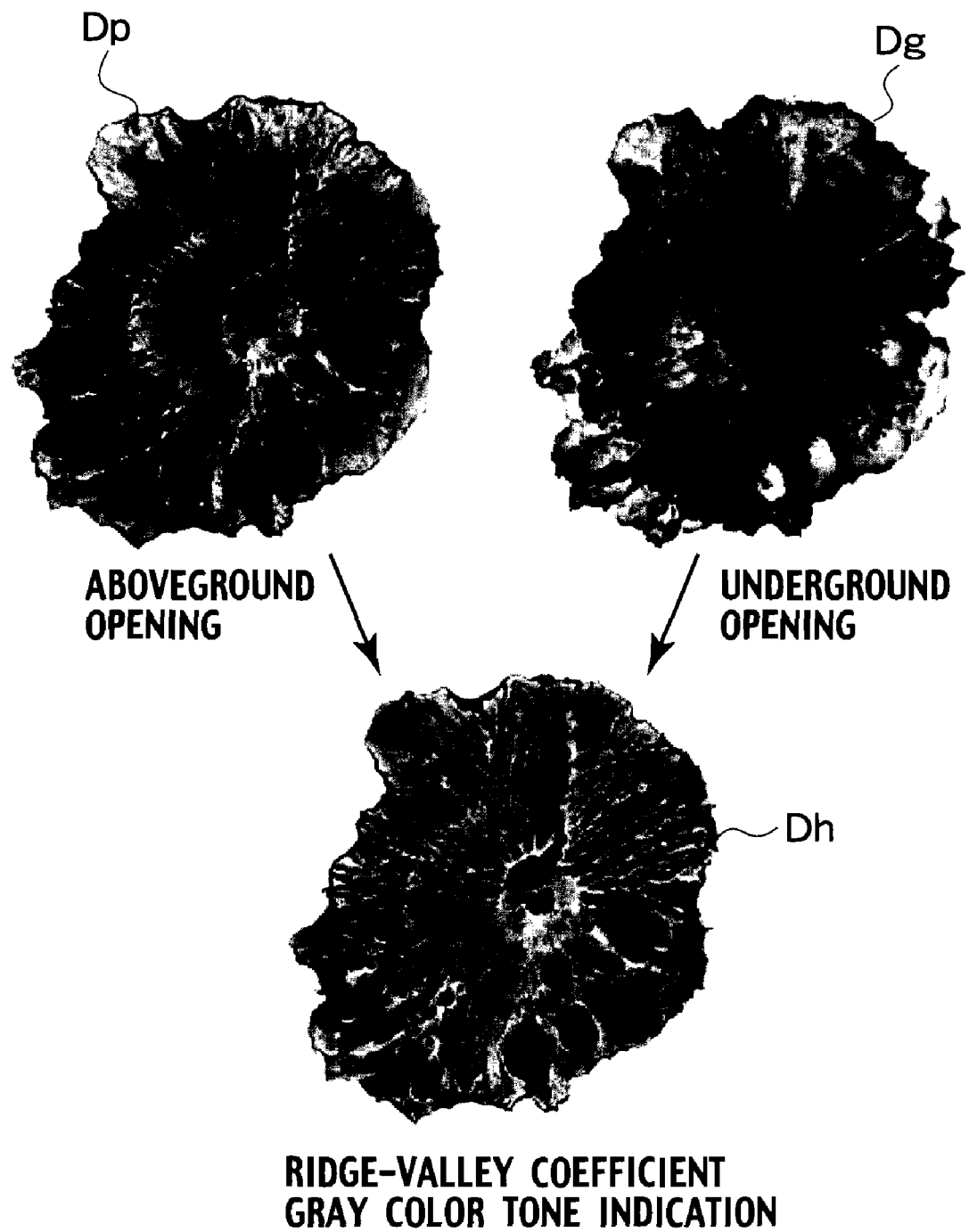
FIG. 21 is an illustration of a generation step of a synthetic image of an aboveground opening image and an underground opening image in the visualization processing system of FIG. 11.
Figure 22:
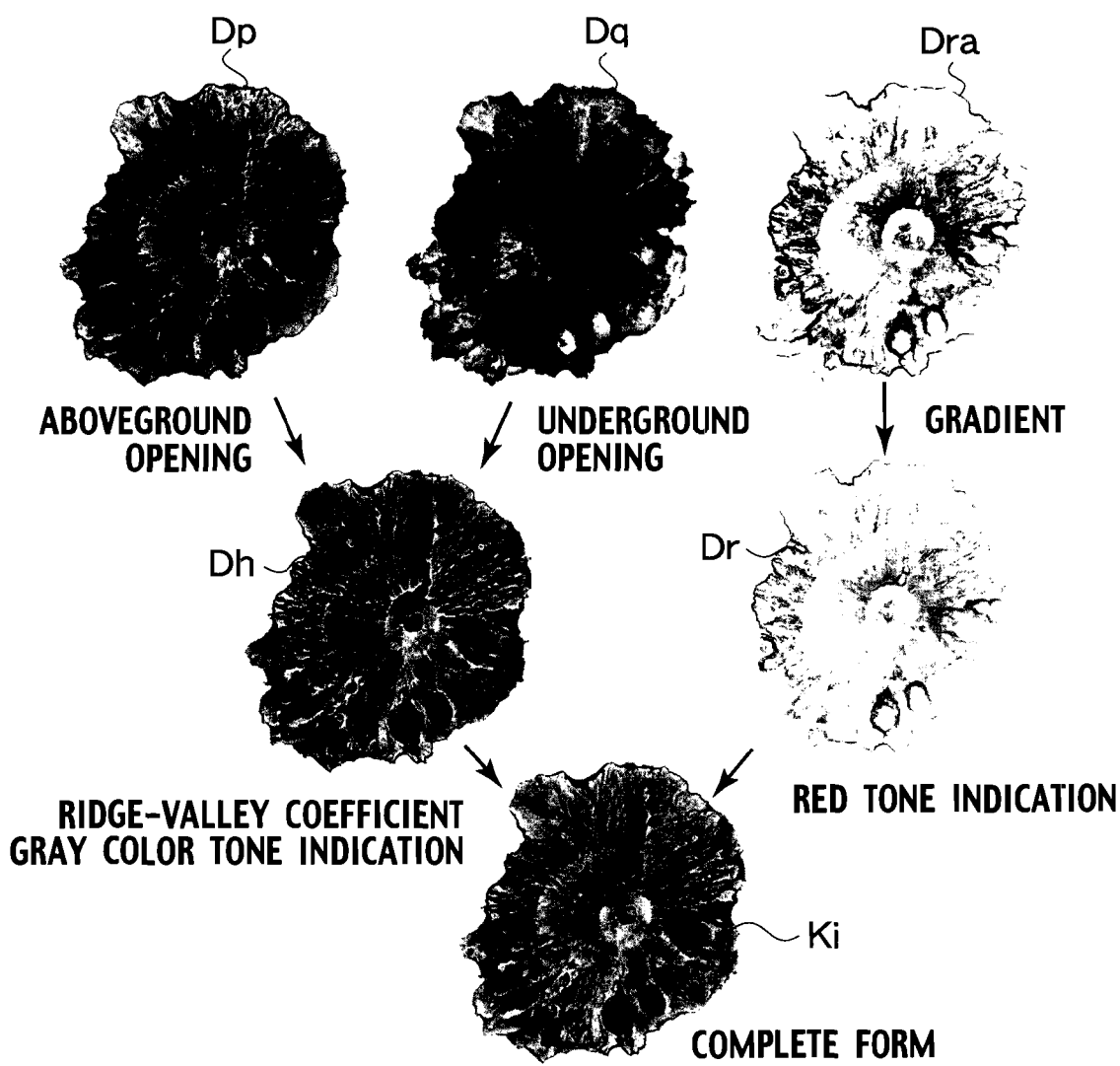
FIG. 22 is an illustration of steps for generation of a gradient reddening stereoscopic image in the visualization processing system of FIG. 11.

FIG. 11 is a block diagram of a visualization processing system VPS2 including a gradient reddening stereoscopic image generator 4 according to this mode of embodiment, FIG. 12, an illustration of a laser measurement in the system VPS2, FIG. 13, an illustration of an eight-directional array, FIG. 14, an illustration of principles of an aboveground opening and an underground opening, FIG. 15, a diagram illustrating principal patterns of aboveground opening and underground opening, FIG. 16, a stereoscopic illustration of an aboveground opening and an underground opening, FIG. 17, a diagram illustrating a sample point and a distance of aboveground opening and underground opening, FIG. 18, a diagram illustrating gray scale allocation, FIG. 19, a block diagram of a convexity-emphasized image creator, a concavity-emphasized image creator, and a first synthesizer, FIG. 20, a block diagram of an inclination-emphasized image creator, and a second synthesizer, FIG. 21, an illustration of a generation step of a synthetic image of an aboveground opening image and an underground opening image, and FIG. 22, an illustration of steps for generation of a gradient reddening stereoscopic image.

Figure 23:
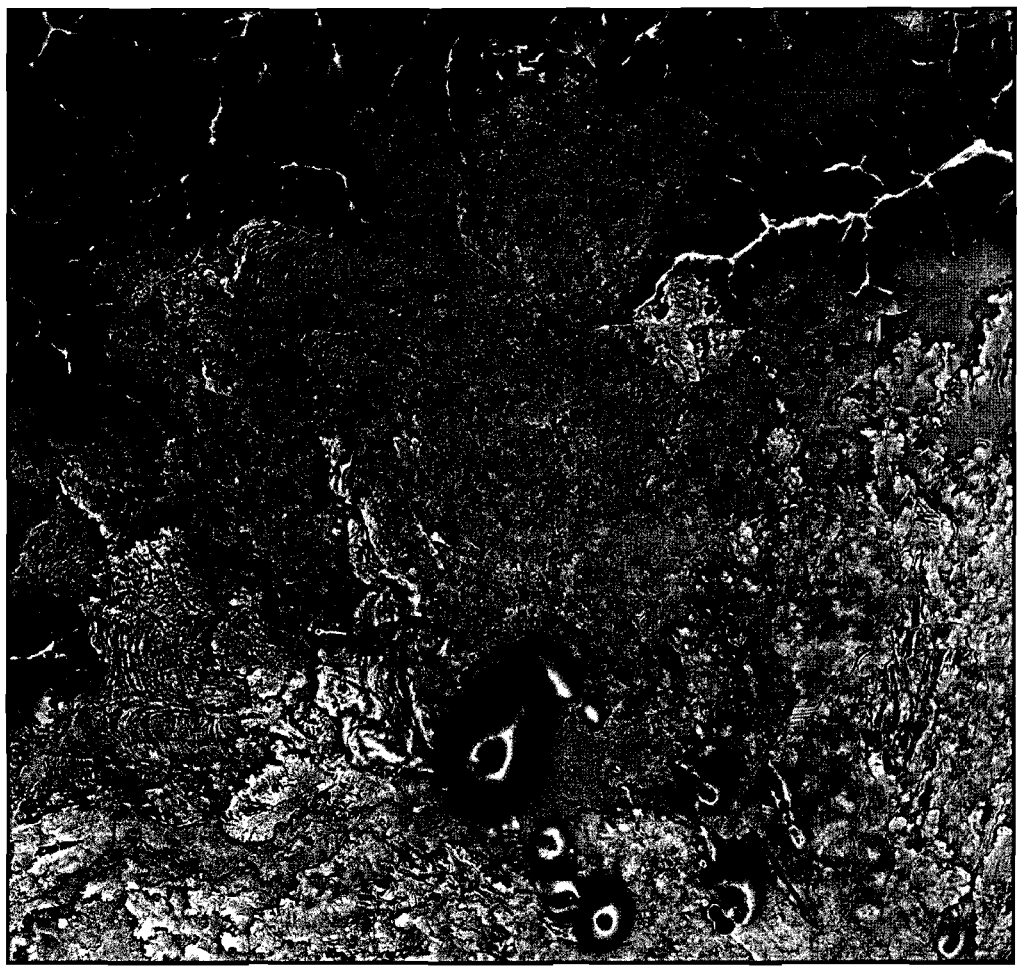
FIG. 23 is a view of a stereoscopically visualized image of Aokigahara, Mt. Fuji, obtained by the visualization processing system of FIG. 11.
Figure 24:
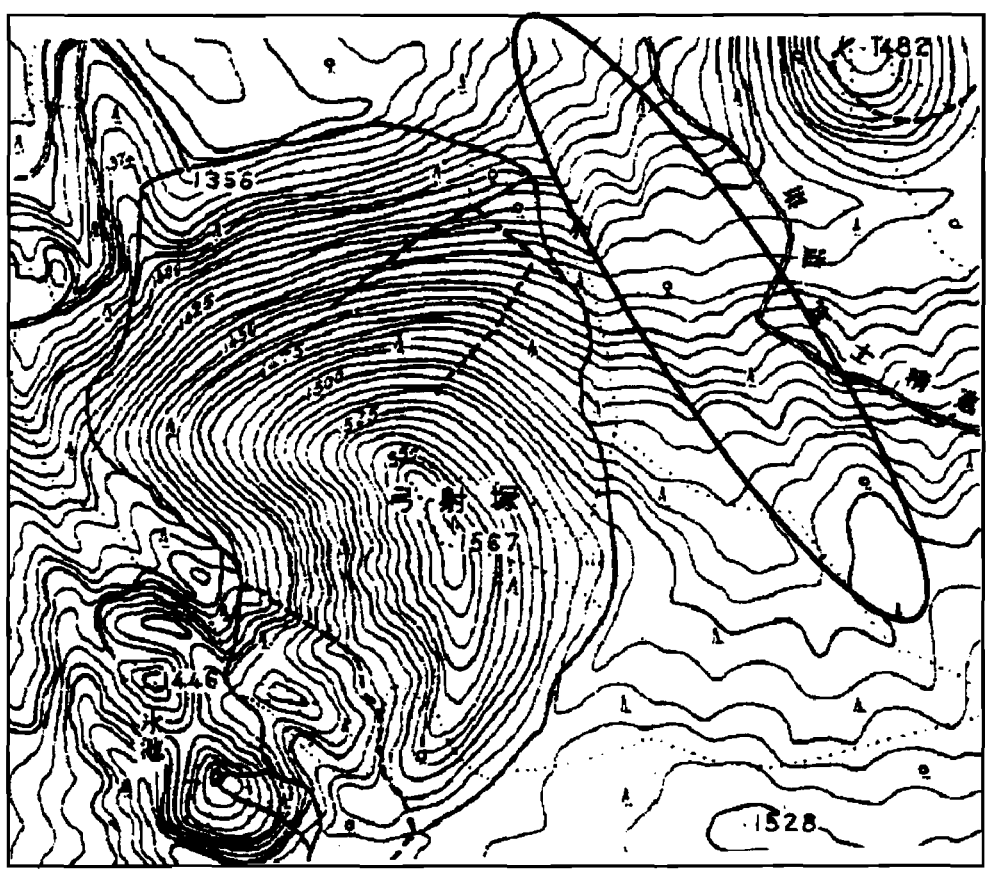
FIG. 24 is a contour-lined topographic map based on an aerial mapping measurement of a southern region of a Tenjinyama ski area, Aokigahara, Mt. Fuji.
Figure 25:
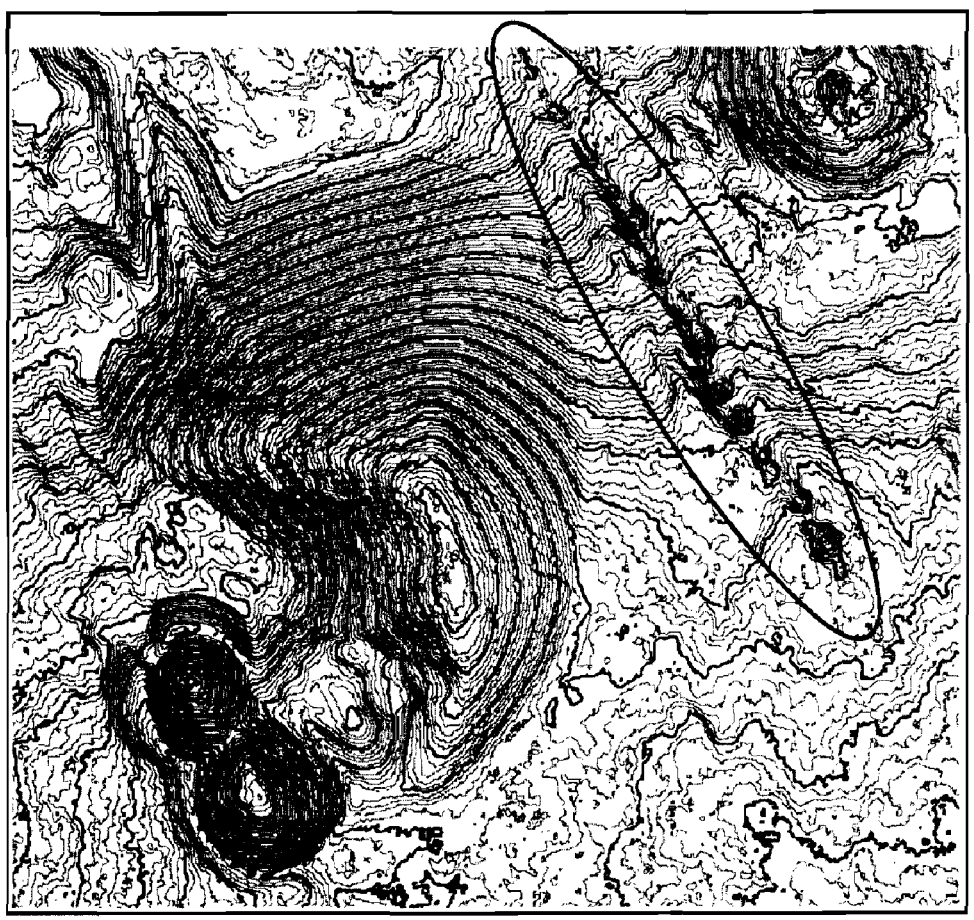
FIG. 25 is a contour-lined topographic map based on laser measurement data of the same region.
Figure 26:
FIG. 26 is a magnified view of a stereoscopically visualized image of the same region.

Further, FIG. 23 is a view of a stereoscopically visualized image of Aokigahara, Mt. Fuji, obtained by the visualization processing system VPS2, FIG. 24, a contour-lined topographic map based on an aerial mapping measurement of a southern region of a Tenjinyama ski area, Aokigahara, Mt. Fuji, FIG. 25, a contour-lined topographic map based on laser measurement data of the same region, FIG. 26, a magnified view of a stereoscopically visualized image of the same region, FIG. 27, a magnified view of a stereoscopically visualized image of another region, and FIG. 28, a magnified view of a stereoscopically visualized image of another region.

This mode of embodiment is configured to determine an inclination corresponding to the inclination $G_m$ in the first mode of embodiment, an aboveground opening corresponding to the elevation degree $\Psi_m^+$ in the first mode of embodiment, and an underground opening corresponding to the depression degree $\Psi_m^-$ in the first mode of embodiment, as three parameters based on DEM (Digital Elevation Model) data, and store their flat plane distribution as a gray scale image.

A difference image between aboveground and underground is entered in a gray, and the inclination, in a red channel, for creation of a pseudo-color image, to thereby effect indication to be whitish at a ridge or crest part, and blackish in valley or howe, while it gets red as inclined part becomes steep. Such combination of indication allows creation of an image (hereafter sometimes called a stereoscopic reddened map) to be solid in appearance even on a single sheet.

In other words, for a map to be solid, this mode of embodiment employs a stereoscopic indication method, in which intervals between contour lines are meshed, and for a respective mesh, a difference to a neighboring mesh, that is, an inclination is indicated by a red color tone, and whether high or low in comparison with periphery is indicated by a gray scale. This corresponds to the elevation-depression degree $\Psi_m$ in the first mode of embodiment, which is referred to as a ridge-valley shaping tendency in this mode of embodiment, suggesting a brighter place to be (ridge-like) higher than periphery, and a darker place to be (valley-like) lower than periphery, of which brightness and darkness are multiplication-synthesized to thereby generate a solid appearance.

FIG. 11 shows a schematic arrangement of the gradient reddening stereoscopic image generator 4 according to this mode of embodiment. As shown in FIG. 11, the gradient reddening stereoscopic image generator 4 of this mode of embodiment is provided with a computer function described below. The gradient reddening stereoscopic image generator 4 further has a variety of databases connected thereto.

A database 1 has a laser data Ri stored therein. For the laser data (Rx, Ry, Rz: coordinates of laser data referred to by addition of R), as illustrated in FIG. 12, by an aircraft flying level in the sky above a target district (preferably, a digital camera pickup range), a laser beam is emitted downward, and from the time required to go and back, aircraft's location and posture, and angle of emission, ground surface's x, y, z are determined by (computer) calculation and stored. Employed for grasp of the aircraft's location is a GPS (not shown), and for grasp of the posture, an IMU.

The laser emitter (unshown at Z) is adapted for 33,000 shots per second, allowing acquisition of altitude points (Rx, Ry, Rz) in a density of one point every 80 cm.

In the case a plurality of reflected pulses are measured for one shot of laser emission, data of a final reflection is employed and stored.

Further, by checking received laser data for a tendency of distribution, points spiked higher than periphery are removed as being laser data of trees having failed to be passed, in addition to removal of laser data else than tree, such as a house, automobiles, or bridge. Therefore, the database 1 simply stores a laser data Ri of ground surface.

A database 2 has stored therein at least a contour map Hi (1/25,000: with numbered contour lines) of the digital camera pickup range. Further, the contour map is provided with characteristic point coordinates (Hx, Hy, Hz: contour map data).

Further, a database 3 has stored therein a stereo-matching data Mi. The stereo-matching data Mi is created as a stereoscopic image from two air photos that have picked up an identical area. For example, a known building is extracted from the two photos, and a side of the building is given a Z value for solidization (Mx, My, Mz), which constitutes a reference for Z values to be given to others.

A DEM data creator 6 reads laser data Ri of the database 1, generating a contour map in which respective altitudes identical in value are connected, and creates a TIN for the contour map, to restore a ground surface. It then determines heights of crossing points between the TIN and respective lattice points, to produce DEM (Digital Elevation Model) data.

Further, the DEM data creator 6 reads a contour map Hi stored in the database 2, and generates the TIN mutually connecting contour lines, which is converted to the above-noted DEM data.

Next, description is made of a DEM data to be employed in this mode of embodiment. For example, for a "numeric map 50-m mesh (altitude)", from meshes of a 1/25,000 topographic map vertically and horizontally divided into 200 equal pails (by mesh pitches of 2.25 seconds in latitude-line direction and 1.50 seconds in longitude-line direction), their central altitudes are read at intervals of 1 m, to be arrayed two-dimensional.

Further, in this mode of embodiment, the gradient reddening stereoscopic image creator 4 includes an aboveground opening data creator 9, an underground opening data creator 10, a gradient calculator 8, a convexity-emphasized image creator 11, a concavity-emphasized image creator 12, an inclination emphasizer 13, a first synthesizer 14, and a second synthesizer 15 to display 16 a stereoscopic reddish map k.

In this mode of embodiment, the concept of an opening is used. The opening is a quantified degree by which a spot in concern is convex aboveground or concave underground in comparison with surroundings. In other words, as illustrated in FIG. 14, an aboveground opening is defined as an extent of the sky to be seen within a range of a distance L from a focused sample point, and an underground opening is defined as an extent under the ground, within a range of the distance L, when taking a survey in the soil in a handstand position.

The openings depend on the distance L and a surrounding terrain. FIG. 15 illustrates, for 9 kinds of principal terrains, their aboveground opening and underground opening by graphs of octagons representing an aboveground angle and an underground angle in respective azimuths. Generally, the aboveground opening increases as the spot is projected higher from the surrounding, and has a value to be large at a crest or ridge, but small in a howe or at a valley bottom. To the contrary, the underground opening increases as the spot is cut underground lower, and has a value to be large in a howe or at a valley bottom, but small at a crest or ridge. Actually, even in the range of distance L, a variety of principal terrains are weaved, so that the octagonal graphs of aboveground angle and underground angle are frequently deformed, giving varieties of opening values.

As will be described, D φL and D ψL have non-increasing characteristics to L, and Φ L and Ψ L have non-increasing characteristics to L, accordingly.

Further, the opening diagram permits extraction of information to fit to the terrain scale, by specification of a calculated distance, allowing for an indication free from dependency on directional and local noises.

That is, excellent extraction of ridge line and valley line allows abundant geographical and geological information to be read: as illustrated in FIG. 16, on a DEM data (ground surface: solid: FIG. 16(a)) within a fixed range, a spot A in concern is set, which is connected with a point B to be a greatest peak when viewed in any one of eight directions therefrom, by a straight line L1 that defines, to a horizontal line, an angular vector θi to be determined. In this way, over the eight directions, angular vectors are determined, of which an average is called an aboveground opening θi; and on an invert DEM data (FIG. 16(c)), which is a reverse of a solid (FIG. 16(b)) having an air layer pushed on the DEM data of the fixed range (ground surface: solid), the spot A in concern is connected with a point C (corresponding to a deepest place) to be a greatest peak when viewed in any one of eight directions therefrom, by a straight line L2 that defines, to the horizontal line, an angle to be determined. This angle is determined over the eight angles, and averaged, which is called an underground opening ψi.

That is, the aboveground opening data creator 9 produces, on a DEM data included within a range of a fixed distance from a focused point, a terrain section in each of eight directions, and determines a maximum value (in view of a plumb direction) among inclinations of connection lines (L1 of FIG. 16(a)) between the focused point and respective terrain points. A process like this is executed in the eight directions. The angle of inclination is an angle from the zenith (90 degrees on a flat, above 90 degrees at a ridge or crest, or below 90 degrees at a valley bottom or in a howe); and the underground opening data creator 10 produces, within a range of the fixed distance from the focused point on an invert DEM data, a terrain section in each of eight directions, and determines a maximum value among inclinations of connection lines between the focused point and respective terrain points (to be a minimum value when looking L2 in the plumb direction in a three-dimensional figure of a ground surface of FIG. 16(a)). A process like this is executed in the eight directions.

When looking L2 in the plumb direction in the three-dimensional figure of the ground surface of FIG. 16(a), the angle ψi has 90 degrees on a flat, under 90 degrees at a ridge or crest, or above 90 degrees at a valley bottom or in a howe.

In other words, for the aboveground opening and underground opening, as illustrated in FIG. 17, two base points A (iA, jA, HA) and B (iB, jB, HB) are supposed. As the sample spacing is 1 m, the distance between A and B is given, such that $$P=\{(i_A-i_B)^2+(j_A-j_B)^2\}^{1/2} \qquad (1).$$

FIG. 17(a) illustrates a relationship between sample points A and B, relative to an altitude 0 m as a reference. An elevation angle θ the sample point A has to the sample point B is given, such that $$\theta=\tan^{-1}\{(HB-HA)/P\}.$$

The sign of θ is positive for ① HA<HB, or negative for ② HA>HB.

A set of sample points residing in an azimuth D within a range of a distance L from a focused sample point is denoted DSL, which will be called "a D-L set of a focused sample point". Letting now D β L: a maximum value among elevation angles for respective elements of DSL of a focused sample point, and D δ L: a minimum value among elevation angles for respective elements of DSL of a focused sample point (refer to FIG. 17(b)), the following definitions are given.

Definition 1: an aboveground angle and an underground angle of a D-L set of a focused sample point shall mean respectively such that $$D\phi L = 90 - D\beta L, \text{ and}$$

$$D\psi L = 90 + D\delta L.$$

D φ L means a maximum value of a zenith angle in which the sky in an azimuth D can be seen within a distance L from a focused sample point. A generally called horizon angle corresponds to the aboveground angle as L is an infinity. And, D ψL means a maximum value of a nadir angle in which the soil in an azimuth D can be seen within a distance L from a focused sample point. As L is increased, the number of sample points belonging to DSL increases, whereto D β L has a non-decreasing characteristic, and on the contrary, D δ L has a non-increasing characteristic. Therefore, D φ L as well as D ψ 1 has a non-increasing characteristic to L.

In the geodesy, the high angle is a concept defined to a horizontal plane as a reference passing a focused sample point, and strictly, not coincident with θ. Further, for a strict discussion of aboveground angle and underground angle, the curvature of the earth should also be considered, and the definition 1 is not always an exact description. The definition 1 is a concept defined for a geomorphic analysis assumed to be made by using DEM to the last.

The aboveground angle and the underground angle have been concepts for a specified azimuth D, which will be expanded by introducing the following definition.

Definition II: An aboveground opening and an underground opening of a distance L from a focused sample point shall mean respectively such that $$\Phi L = (0\phi L + 45\phi L + 90\phi L + 135\phi L + 180\phi L + 225\phi L + 270\phi L + 315\phi L)/8, \text{ and}$$

$$\Psi L = (0\psi L + 45\psi L + 90\psi L + 135\psi L + 180\psi L + 225\psi L + 270\psi L + 315\psi L)/8.$$

The aboveground opening represents an extent of the sky to be seen within a range of the distance L from the focused sample point, and the underground opening represents an extent under the ground, within a range of the distance L, when taking a survey in the soil in a handstand position (refer to FIG. 14).

The gradient calculator 8 is adapted to mesh a DEM data into squares, and determine an average gradient of surfaces of squares neighboring a focused point on the meshes. The neighboring squares are four in number, any one of which is chosen as a focused square. Then, an average inclination and heights at four corners of the focused square are determined. The average inclination is a gradient of surface approximated from four points by using the method of least squares.

The convexity-emphasized image creator 11 has a first gray scale for indicating a ridge and a valley bottom by brightness, as illustrated in FIG. 18(a), and is adapted, every time when the aboveground opening data creator 9 determines an aboveground opening (as an average angle when a range of L is seen in eight directions from a focused point: an index for judgment of whether the residing place is high), to calculate a brightness (luminance) commensurate with the aboveground opening θi.

For example, for values of aboveground opening falling within a range of about 40 degrees to 120 degrees, the first gray scale is associated with a range of 50 degrees to 110 degrees, which is allotted to 255 tones.

That is, toward a ridge part (convex), the place has a greater value of aboveground opening, and becomes white in color.

Then, as shown in FIG. 19, at the convexity-emphasized image creator 11, a convexity emphasizing color allotment process 20 reads an aboveground opening image data Da, and allots, to a mesh region having a focused point (coordinate) (in the case contour lines connecting identical Z values of DEM data are meshed (e.g. 1 m) into squares, and a focused point is set to a point at any of four corners of mesh) a color data based on the first gray scale, which is stored (as an aboveground opening image data Dpa) in an aboveground opening file 21. Then, a tone corrector 22 stores, in a file 23, the aboveground opening image data Dpa having color tones thereof inverted, as an aboveground opening layer Dp. That is, there is obtained an aboveground opening layer Dp adjusted for the ridge to be indicated white.

A concavity extractor 12 has a second gray scale for indicating a valley bottom and a ridge by brightness, as illustrated in FIG. 18(*b*), and is adapted, every time when the underground opening data creator 10 determines an underground opening ψi (as an average in eight directions from a focused point), to calculate a brightness commensurate with the underground opening ψi.

For example, for values of underground opening falling within a range of about 40 degrees to 120 degrees, the second gray scale is associated with a range of 50 degrees to 110 degrees, which is allotted to 255 tones.

That is, toward a valley bottom part (concave), the place has a greater value of underground opening, and becomes black in color.

Then, as shown in FIG. 19, at the concavity-emphasized image creator 12, a concavity emphasizing color allotment process 25 reads an underground opening image data Db, and allots, to a mesh region having a focused point (coordinate) (in the case contour lines connecting identical Z values of DEM data are meshed (e.g. 1 m) into squares, and a focused point is set to a point at any of four corners of mesh) a color data based on the second gray scale, which is stored in an underground opening file 26. Then, a tone correction process 27 makes a correction of color tones of the underground opening image data Db.

If the color is toned excessively black, it is set to a tone of color according to a corrected tone curve. This is called an underground opening layer Dq, and stored in a file 28.

The inclination-emphasized image creator 13 has a third gray scale for indicating a degree of inclination by brightness, as illustrated in FIG. 18(*c*), and is adapted, every time when the gradient calculator 8 determines an inclination degree (as an average in four directions from a focused point), to calculate a brightness (luminance) commensurate with the inclination degree.

For example, for values of inclination αi falling within a range of about 0 degree to 70 degrees, the third gray scale is associated with a range of 0 degree to 50 degrees, which is allotted to 255 tones. That is, 0 degree to be white, and 50 degrees to be black. The color is blackened as the spot has a greater inclination α.

Then, as shown in FIG. 20, at the inclination-emphasized image creator 13, an inclination emphasizing color allotment process 30 stores, in a file 31, a difference image between the underground opening image data Db and the aboveground opening image data Da, as a gradient image Dra.

At this time, a color data based on the third gray scale is allotted to a mesh region having a focused point (coordinate) (in the case contour lines connecting identical Z values of DEM data are meshed (e.g. 1 m) into squares, and a focused point is set to a point at any of four corners of mesh). Then, a reddening process 32 has an RGB color mode function for emphasizing R. That is, there is obtained in a file 33 a gradient-emphasized image Dr that has an emphasized red as the inclination is greater.

The first synthesizer 14 is adapted for a multiplication of the aboveground opening layer Dp and the underground opening layer Dq to obtain a synthetic image Dh (Dh=Dp+D1) thereby synthesized. At this time, a balance of both is adjusted to avoid collapsing valley part.

The above-noted "multiplication" is a term in a layer mode on a photoshop, that corresponds to an OR operation for numeric process.

| Brightness | Gray scale | i-1 | i-2 | i-3 |
|---|---|---|---|---|
| Lighter as higher | aboveground | 36 | 52 | 45 |
| Darker as higher | underground | 32 | 48 | 61 |
| | Total | 68 | 100 | 106 |

In the balance adjustment, for allocation of value between aboveground and underground at a spot, the ground surface is cut out by a fixed radius (L/2) about the spot.

Assuming an entirety of sky to be uniform in brightness, the extent of sky looked up from a surface of ground gives a brightness of the ground surface.

That is, an aboveground opening constitutes the brightness. However, assuming light spiking around, a value of underground opening should be considered.

Depending on how the ratio of both is settled, an arbitrary modification can be achieved, such as for an emphasis at a ridge part of terrain, for example. For a desirable emphasis of a terrain in a valley, the value of b may be increased.

Index of brightness =

$a \times$ aboveground opening $- b \times$ underground opening, where a+b=1.

That is, as illustrated in FIG. 21, the aboveground opening layer Dp (with ridge emphasized white) and the underground opening layer Dq (with bottom emphasized black) are multiplication-synthesized to obtain a synthetic image gray-toned for indication (Dh=Dp+D1).

On the other hand, the second synthesizer is adapted for synthesizing the gradient-emphasized image Dr in the file and the synthetic image Dh obtained by a synthesis at the first synthesizer, to have stereoscopic reddening image as the map $k_i$ emphasized at the ridge in red color, for indication on the display.

That is, as illustrated in FIG. 22, there is obtained the gradient-emphasized image Dr in which red is emphasized for greater gradients than the gradient image Dra, besides the synthetic image Dh of a gray tone indication by a multiplication-synthesis of the aboveground opening layer Dp (with ridge emphasized white) and the underground opening layer Dq (with bottom emphasized black).

Then, the gradient-emphasized image Dr is synthesized with the synthetic image Dh.

FIG. 23 is a stereoscopic map of a whole neighborhood of Aokigahara, whereto a process according to this mode of embodiment is employed. As seen from FIG. 23, just in the south of Tenjinnyama ski area, a glacial hole crater row extends, which has a crater that had outflown an Aokigahara lava flow. It is difficult to verify the location in an aerial photograph where the deep forest constitutes an obstacle. Further, the glacial hole crater row looks as it may be in a map by laser data (refer to FIG. 25), while an indication thereof is difficult in a contour map by aerial survey (refer to FIG. 24).

Contrary thereto, in a stereoscopic picture according to this mode of embodiment, as seen from FIG. 6, the glacial hole crater row appears as it is clear defined, as well as a lava flow formed with undulations and routes of the climb.

Figure 27:
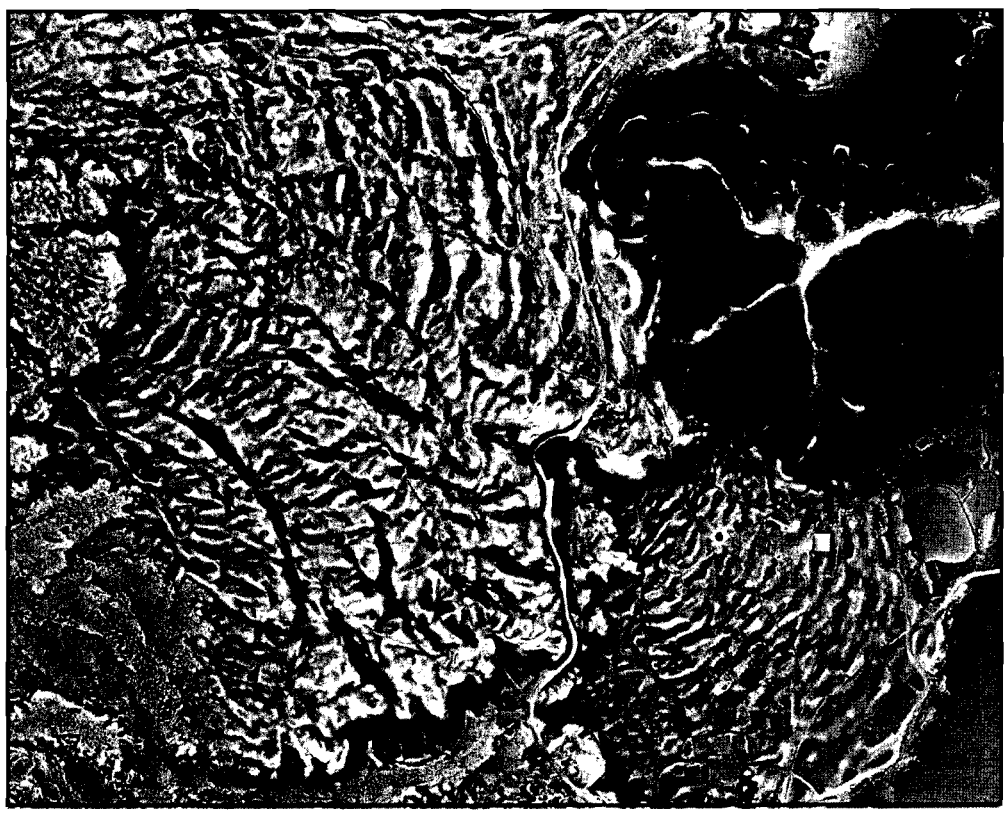
FIG. 27 is a magnified view of a stereoscopically visualized image of another region.
Figure 28:
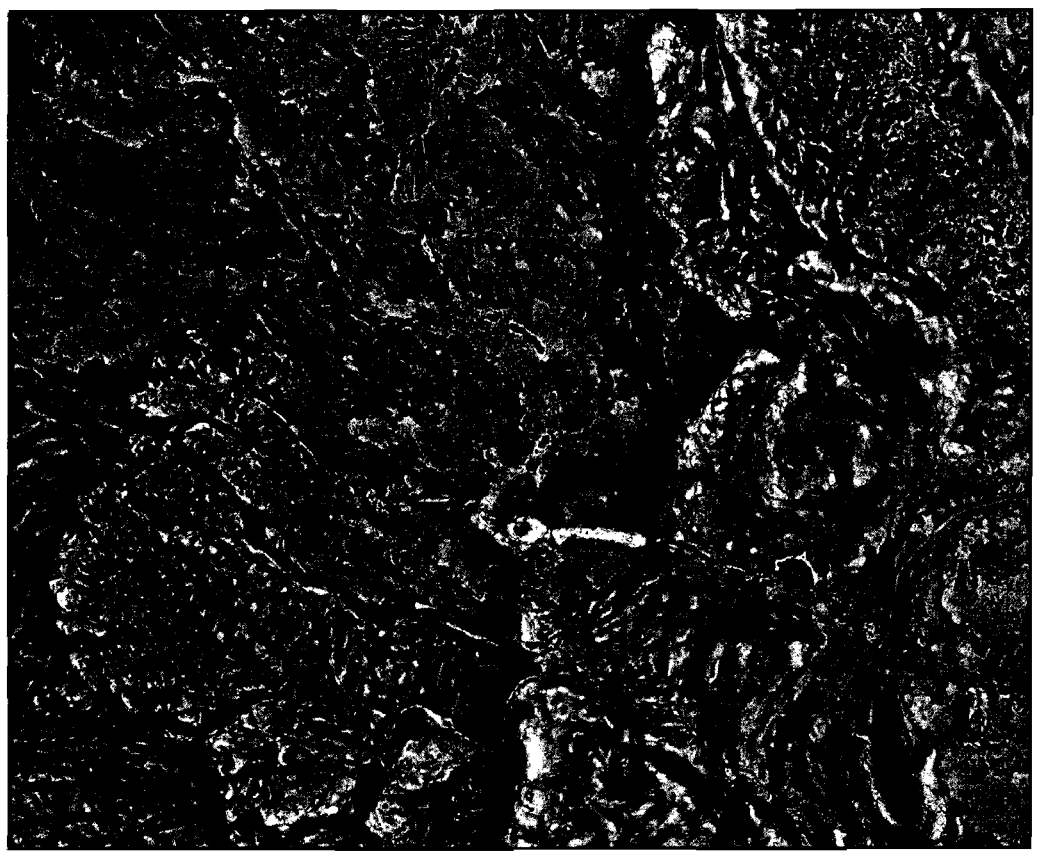
FIG. 28 is a magnified view of a stereoscopically visualized image of another region.

Further, in FIG. 27 and FIG. 28 as magnified views, there can be seen visually defined lava flows, road inclinations, and undulations, It is noted that the technique in this mode of embodiment is applicable to a terrain of Venus as well as a terrain of Mars. In addition, it is applicable for visualization of a ruggedness measured by an electron microscope. Further, if applied to a game machine, it allows a stereoscopic feeling to be given without putting glasses.

As is above, in this mode of embodiment, based on a DEM (Digital Elevation Model) data, three parameters of inclination, aboveground opening, and underground opening are determined, and their distribution on a flat plane is stored as a gray scale image. A difference image between aboveground and underground is entered in a gray, and the inclination, in a red channel, for creation of a pseudo-color image, to thereby effect indication to be whitish at a ridge or crest pat, and blackish in valley or howe, while it gets red as inclined part becomes steep. By combination of such indication, an image can be generated with a stereoscopic appearance even on a single sheet. Therefore, it allows at a glance a grasp of degrees of concavo-convex heights as well as a degree of gradient.

THIRD MODE OF EMBODIMENT

Description is now made of a third mode of embodiment of the invention to which the visualization processing system VPS1 of FIG. 1 is aided, with reference to FIG. 29 to FIG. 32.

Figure 30:
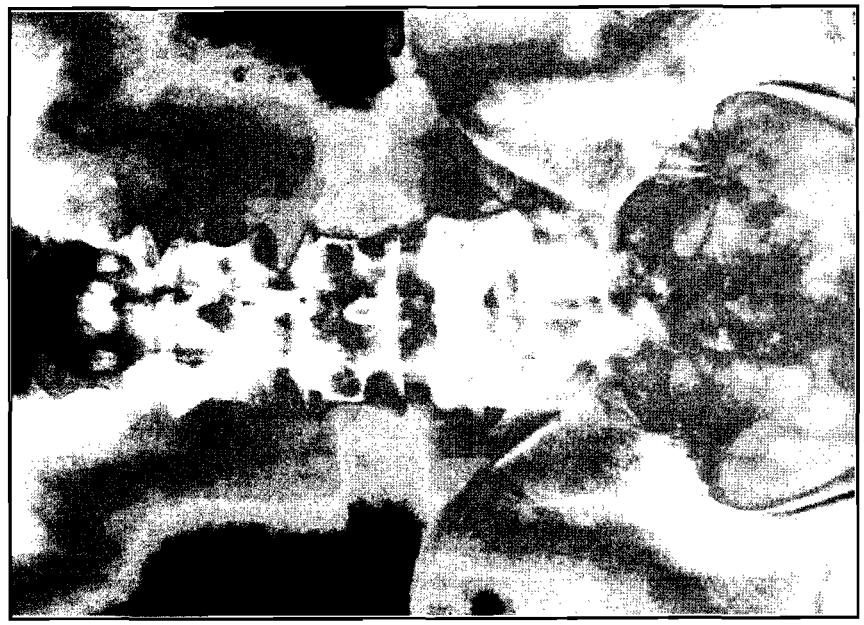
FIG. 30 is a graduation-tinted slice image of the fluoroscopic view of FIG. 29.
Figure 29:
FIG. 29 is an X-ray fluoroscopic view of a human body.
Figure 32:
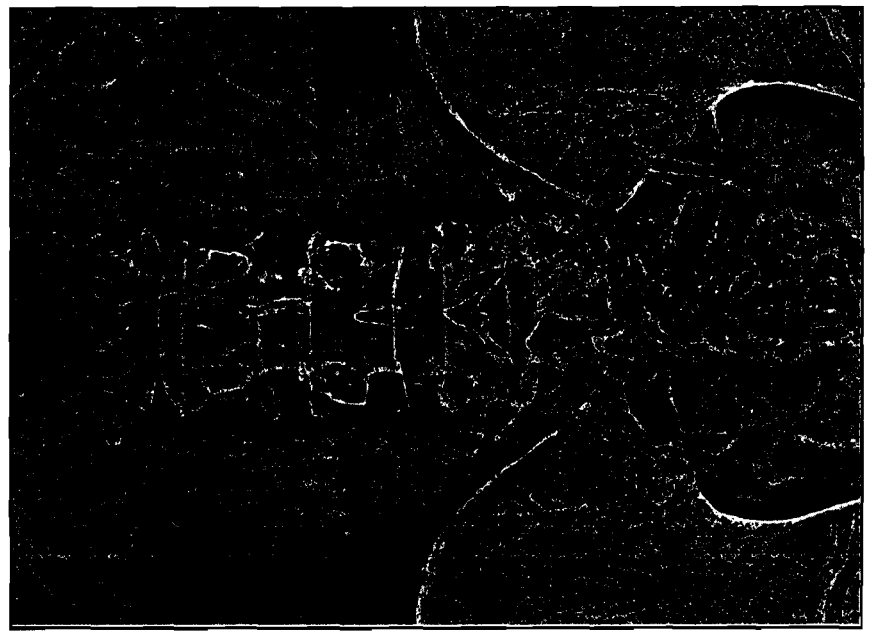
FIG. 32 is a synthetic image of the image of FIG. 30 and the image of FIG. 31 superposed thereon.
Figure 31:
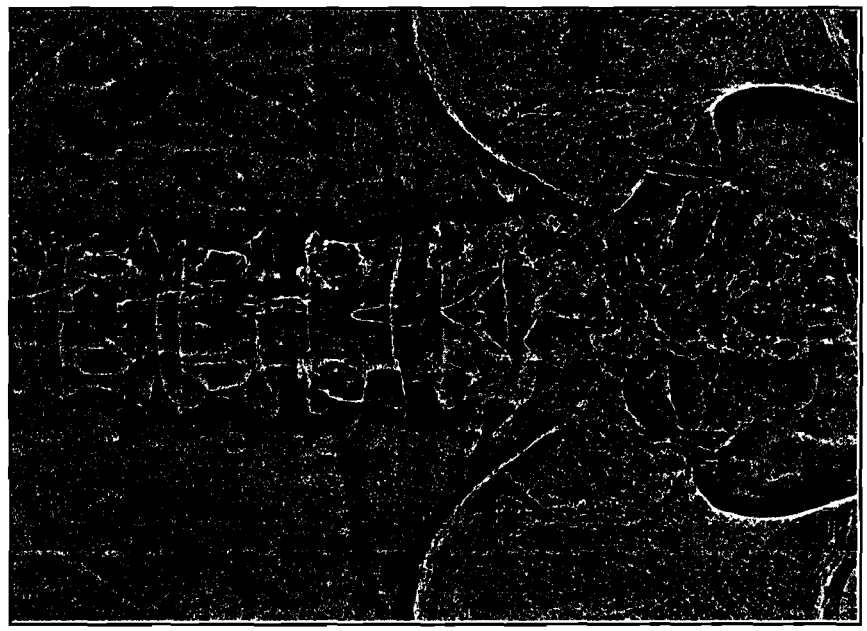
FIG. 31 is a red-toned elevation-depression degree distribution image obtained by processing the fluoroscopic view of FIG. 29 by the visualization processing system of FIG. 1.

FIG. 29 is an X-ray fluoroscopic view of a human body, FIG. 30, a graduation-tinted slice image of the fluoroscopic view of FIG. 29, FIG. 31, a red-toned elevation-depression degree distribution image obtained by processing the fluoroscopic view by the visualization processing system VPS1, and FIG. 32, a synthetic image of the image of FIG. 30 and the image of FIG. 31 superposed thereon.

The graduation-tinted slice image of FIG. 30 is an image, as the X-ray fluoroscopic view of FIG. 29 having hue of pixels thereof sliced and graduation-tinted in dependence on their brightness, for which, in this mode of embodiment, a field of vectors having positional information and brightness of the pixels as their components is stored, in the memory 53, as the vector field 70 of the visualization processing system VPS1, and displayed, at the information output section 55, as a result of process P7 by the seventh processing file 67 of the visualization processing program 60.

Further, the red-toned elevation-depression degree distribution image of FIG. 31 is displayed, at the information output section 55, as a result of process P5 by the fifth processing file 65 of the visualization processing program 60.

Then, the synthetic image of FIG. 32 is displayed, at the information output section 55, as a result of process P8 by the eighth processing file 68 of the visualization processing program 60.

INDUSTRIAL APPLICABILITY

According to the invention, there can be provided a visualization processing system, a visualization processing method, and a visulialtion processing program, which are adapted to visualize a vector field, with local solid attributes thereof inclusive, on a substantially two-dimensional field of view, in a manner that allows an intuitive visible perception.

Further, there can be provided a visualization processing system, a visualization processing method, and a visualization processing program, which are adapted to generate a gradient reddening stereoscopic image that allows at a glance a stereoscopic grasp of terrain's heights and inclination degrees.

The invention claimed is:

1. A visualization processing method for generation of a stereoscopic image based on a vector field, comprising the steps of:
    mapping the vector field in a three-dimensional coordinate space to obtain a corresponding sequence of coordinate points;
    determining a degree of openness defined about a focused point at a local region of a plane connecting the sequence of coordinate points, by a region at an obverse side of the plane residing within a prescribed radius from the focused point, as an elevation degree of said local region;
    determining a degree of openness defined about the focused point at said local region of the plane connecting the sequence of coordinate points, by a region at a reverse side of the plane residing within the prescribed radius from the focused point as a depression degree of said local region;
    synthesizing the elevation degree and the depression degree in a weighting manner to determine a degree of openness defined about the focused point at said local region of the plane connecting the sequence of coordinate points, by a combination of the region at the obverse side and the region at the reverse side of the plane residing within the prescribed radius from the focused point, as an elevation-depression degree of said local region;
    mapping the three-dimensional coordinate space on the two-dimensional plane, providing a tone indication commensurate with the elevation-depression degree of said local region to a region on the two-dimensional plane corresponding to said local region of the plane connecting the sequence of coordinate points;
    determining an inclination distribution of the plane connecting the sequence of coordinate points, providing on the two-dimensional plane said tone indication for a brightness of a color-toned indication of the inclination distribution; and
    displaying on a display the two-dimensional plane with the tone indication.

2. A visualization processing system for generation of a stereoscopic image based on a vector field, comprising:
    a computer;
    a set of data structures employed as computer components of the computer, the set of data structures defining the vector field, a three-dimensional coordinate space, and a two-dimensional plane; and a set of computer programs employed as computer components of the computer, the set of computer programs comprising:

a first subset thereof for mapping the vector field in the three-dimensional coordinate space to obtain a corresponding sequence of coordinate points;

a second subset thereof for determining a degree of openness defined about a focused point at a local region of a plane connecting the sequence of coordinate points, by a region at an obverse side of the plane residing within a prescribed radius from the focused point as an elevation degree of said local region;

a third subset thereof for determining a degree of openness defined about the focused point at said local region of the plane connecting the sequence of coordinate points, by a region at a reverse side of the plane residing within the prescribed radius from the focused point as a depression degree of said local region;

a fourth subset thereof for synthesizing the elevation degree and the depression degree in a weighting manner to determine a degree of openness defined about the focused point at said local region of the plane connecting the sequence of coordinate points, by a combination of the region at the obverse side and the region at the reverse side of the plane residing within the prescribed radius from the focused point, as an elevation-depression degree of said local region;

a fifth subset thereof for mapping the three-dimensional coordinate space on the two-dimensional plane, providing a tone indication commensurate with the elevation-depression degree of said local region to a region on the two-dimensional plane corresponding to said local region of the plane connecting the sequence of coordinate points; and a sixth subset thereof for determining an inclination distribution of the plane connecting the sequence of coordinate points, the fifth subset providing on the two-dimensional plane said tone indication for a brightness of a color-toned indication of the inclination distribution.

3. The visualization processing system as claimed in claim 2, wherein the elevation degree is defined in terms of a see-through solid angle about the focused point with respect to an obverse side of a range of the plane connecting the sequence of coordinate points.

4. The visualization processing system as claimed in claim 3, wherein the depression degree is defined in terms of a see-through solid angle about the focused point with respect to a reverse side of a range of the plane connecting the sequence of coordinate points.

5. The visualization processing system as claimed in claim 2, wherein the sixth subset provides the color-toned indication of the inclination distribution in red colors.

6. The visualization processing system as claimed in claim 2, wherein the set of computer programs further comprises:

a seventh subset thereof for connecting, among the sequence of coordinate points, those coordinate points equivalent of an attribute in the vector field to obtain an attribute isopleth line; and an eighth subset thereof for mapping the attribute isopleth line on the two-dimensional plane given said tone indication.

7. A non-transitory computer readable medium encoded with:

a set of data structures employable as computer components, the set of data structures defining a vector field, a three-dimensional coordinate space, and a two-dimensional plane; and a set of programs employable as computer components for visualization processing for generation of a stereoscopic image based on the vector field, the set of programs comprising:

a first subset thereof for mapping the vector field in the three-dimensional coordinate space to obtain a corresponding sequence of coordinate points;

a second subset thereof for determining a degree of openness defined about a focused point at a local region of a plane connecting the sequence of coordinate points, by a region at an obverse side of the plane S residing within a prescribed radius from the focused point, as an elevation degree of said local region;

a third subset thereof for determining a degree of openness defined about the focused point at said local region of the plane connecting the sequence of coordinate points, by a region at a reverse side of the plane S residing within the prescribed radius from the focused point, as a depression degree of said local region;

a fourth subset thereof for synthesizing the elevation degree and the depression degree in a weighing manner to determine a degree of openness defined about the focused point at said local region of the plane connecting the sequence of coordinate points, by a combination of the region at the obverse side and the region at the reverse side of the plane residing within the prescribed radius from the focused point, as an elevation-depression degree of said local region;

a fifth subset thereof for mapping the three-dimensional coordinate space on the two-dimensional plane, providing a tone indication commensurate with the elevation-depression degree of said local region to a region on the two-dimensional plane corresponding to said local region of the plane connecting the sequence of coordinate points; and a sixth subset thereof for determining an inclination distribution of the plane connecting the sequence of coordinate points, the fifth subset providing on the two-dimensional plane said tone indication for a brightness of a color-toned indication of the inclination distribution.

8. A visualization processing system for generation of a stereoscopic image based on a vector field, compromising:

a computer;

a set of data structures employed as computer components of the computer, the set of data structures defining the vector field, a three-dimensional coordinate space, and a two-dimensional plane; and a set of computer programs employed as computer components of the computer, the set of computer programs comprising:

a first subset thereof for mapping the vector field in the three-dimensional coordinate space to obtain a corresponding sequence of coordinate points;

a second subset thereof for determining a see-through solid angle defined about a focused point at a local region of a plane connecting the sequence of coordinate points, by a region at an obverse side of the plane residing within a prescribed radius from the focused point, as an elevation degree of said local region;

a third subset thereof for determining a see-through solid angle defined about the focused point at said local region of the plane connecting the sequence of coordinate points, by a region at a reverse side of the plane residing within the prescribed radius from the focused point, as a depression degree of said local region;

a fourth subset thereof for synthesizing the elevation degree and the depression degree in a weighting manner to determine a degree of openness defined about the focused point at said local region of the plane connecting the sequence of coordinate points, by a reverse side of the plane residing within the prescribed radius from the focused point, as an elevation-depression degree of said local region; and a fifth subset thereof for mapping the three-dimensional coordinate space on the two-dimensional plane, providing a tone indication commensurate with the elevation-depression degree of said local region to a region on the two-dimensional plane corresponding to said local region of the plane connecting the sequence of coordinate points.

9. The visualization processing system as claimed in claim 8, wherein the set of computer programs further comprises:

a sixth subset thereof for determining an inclination distribution of the plane connecting the sequence of coordinate points; and the fifth subset providing on the two-dimensional plane said tone indication for a brightness of a color-toned indication of the inclination distribution.

10. The visualization processing system as claimed in claim 9, wherein the sixth subset provides the color-toned indication of the inclination distribution in red colors.

11. The visualization processing system as claimed in claim 8, wherein the set of computer programs further comprises:

a seventh subset thereof for connecting, among the sequence of coordinate points, those coordinate points equivalent of an attribute in the vector field to obtain an attribute isopleth line; and an eighth subset thereof for mapping the attribute isopleth line on the two-dimensional plane given said tone indication.

* * * * *